US007336387B2

(12) United States Patent
Nakami et al.

(10) Patent No.: US 7,336,387 B2
(45) Date of Patent: Feb. 26, 2008

(54) IMAGE PROCESSING DEVICE

(75) Inventors: Yoshihiro Nakami, Nagano-ken (JP);
Masatoshi Matsuhira, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 882 days.

(21) Appl. No.: 10/334,759

(22) Filed: Dec. 30, 2002

(65) Prior Publication Data
US 2003/0151667 A1 Aug. 14, 2003

Related U.S. Application Data

(63) Continuation of application No. PCT/JP02/02447, filed on Mar. 14, 2002.

(30) Foreign Application Priority Data
Mar. 15, 2001 (JP) ............................. 2001-074568

(51) Int. Cl.
*G06F 12/00* (2006.01)
*H04N 1/21* (2006.01)
(52) U.S. Cl. ..................................... 358/1.16; 358/444
(58) Field of Classification Search ...... 358/1.16–1.17, 358/1.13, 1.15, 404, 444, 426.05, 524
See application file for complete search history.

(56) References Cited

U.S. PATENT DOCUMENTS

| 4,333,160 | A | * | 6/1982 | Kobari et al. | ................ | 711/173 |
| 5,208,676 | A | * | 5/1993 | Inui | ........................... | 358/1.16 |
| 5,579,452 | A | * | 11/1996 | Ambalavanar et al. | .... | 358/1.16 |
| 5,970,222 | A | * | 10/1999 | Gusmano et al. | .......... | 358/1.16 |
| 6,115,104 | A | | 9/2000 | Nakatsuka | .................... | 355/40 |
| 6,552,818 | B1 | * | 4/2003 | Nakai et al. | ................ | 358/1.16 |
| 6,603,570 | B2 | * | 8/2003 | Asahi | ......................... | 358/1.15 |
| 7,019,854 | B1 | * | 3/2006 | Sawano | ..................... | 358/1.15 |

FOREIGN PATENT DOCUMENTS

| EP | 0 938 041 A2 | 8/1999 |
| JP | 05-022584 | 1/1993 |
| JP | 09-037092 | 2/1997 |
| JP | 11-138920 | 5/1999 |

(Continued)

OTHER PUBLICATIONS

Abstract of Japanese Patent Pub. No. 05-022584, Pub. Date: Jan. 29, 1993, Patent Abstracts of Japan.

(Continued)

*Primary Examiner*—Scott A. Rogers
(74) *Attorney, Agent, or Firm*—Martine Penilla & Gencarella, LLP

(57) ABSTRACT

A color printer 20 allocates all of the image processing memory resources for image processing on image data GD lined up in the main scanning direction of a print head IH, secures an amount of memory resources for each of the lined up image data GD, and releases the memory resources as the image processing completes. A CPU 51 secures image processing memory resources for an image datum 1 in the storage area of a RAM 53, and releases the secured memory resources when the image processing on the image datum 1 is complete. The CPU 51 repeatedly implements this processing on each image datum contained in one print job.

7 Claims, 18 Drawing Sheets

FOREIGN PATENT DOCUMENTS

| | | |
|---|---|---|
| JP | 11-150656 | 6/1999 |
| JP | 11-314408 | 11/1999 |
| JP | 2001-346042 | 12/2001 |
| JP | 2002-016874 | 1/2002 |
| JP | 2002-033994 | 1/2002 |

OTHER PUBLICATIONS

Abstract of Japanese Patent Pub. No. 09-037092, Pub. Date: Feb. 7, 1997, Patent Abstracts of Japan.

Abstract of Japanese Patent Pub. No. 11-138920, Pub. Date: May 25, 1999, Patent Abstracts of Japan.

Abstract of Japanese Patent Pub. No. 11-150656, Pub. Date: Jun. 2, 1999, Patent Abstracts of Japan.

Abstract of Japanese Patent Pub. No. 11-314408, Pub. Date: Nov. 16, 1999, Patent Abstracts of Japan.

Abstract of Japanese Patent Pub. No. 2001-346042, Pub. Date: Dec. 14, 2001, Patent Abstracts of Japan.

Abstract of Japanese Patent Pub. No. 2002-016874, Pub. Date: Jan. 18, 2002, Patent Abstracts of Japan.

Abstract of Japanese Patent Pub. No. 2002-033994, Pub. Date: Jan. 31, 2002, Patent Abstracts of Japan.

* cited by examiner

US 7,336,387 B2

IMAGE PROCESSING DEVICE

CLAIM FOR PRIORITY

This application claims priority under 35 U.S.C. §§ 120 and 365(c) as a continuation application of prior International Application PCT/JP02/02447, which was filed on Mar. 14, 2002, and which was not published in English under PCT Article 21(2). The disclosure of the prior international application is incorporated herein by reference.

TECHNICAL FIELD

The present invention relates to an image processing device, an image processing output device, and an image processing program for carrying out image processing on image data.

BACKGROUND ART

The image quality for digital image data generated by a digital still camera (DSC), digital video camera (DVC), scanner or the like can be arbitrarily adjusted with image processing. For example, gamma correction processing, as well as brightness, contrast, sharpness and other image quality correction processing may be arbitrarily or automatically carried out in image processing.

Also, digital image data have the characteristic that a plurality of image data can be distributed on one printing sheet and that the layout can be freely edited when distributing the plurality of image data.

However, when carrying out suitable image processing on each image datum, a gamma correction table used in gamma correction processing or an LUT used in image quality correction processing, for example, is generated, and a holding area must be secured for each image datum in a storage area of the storage device such as a RAM. When distributing a plurality of image data to one printing sheet, all of the gamma correction tables or the like for the plurality of data must be retained, so there was the problem that when the image data distributed on one printing sheet increased, the required memory resources grew.

In particular, this was a serious problem for stand-alone type printers carrying out image processing and printing processing without a personal computer whose available memory resources are limited.

DISCLOSURE OF THE INVENTION

The present invention was devised to solve the problems, and it is an object thereof to decrease the amount of memory resources required for image processing as well as to implement suitable image processing for each image datum.

In order to solve the problems, a first aspect of the present invention provides an image processing device for carrying out image processing using image data and image processing control information used during image processing of the image data as well as associated therewith. An image processing device according to the first aspect of the present invention is characterized by the fact of comprising first storage unit having a storage area with a predetermined capacity used in the image processing; image data acquisition unit for acquiring one image datum from a plurality of image data contained in an output job according to an output sequence for printing the image data; information acquisition unit for acquiring the image processing control information associated with the acquired image datum; work area securing unit for securing a work area in the storage area for carrying out image processing on the acquired image datum; image processing unit for carrying out image processing on the acquired image datum based on the acquired image processing control information using the secured work area; and work area releasing unit for releasing the secured work area when the image processing on the image datum is complete.

According to the image processing device of the first aspect of the present invention, image processing control information associated with an image datum is acquired; a work area is secured in a storage area for carrying out image processing on the image datum; image processing is carried out on the image datum based on the acquired image processing control information using the secured work area; and the secured work area is released when the image processing on the image datum is complete, so it is possible to decrease the amount of memory resources required for image processing and suitable image processing can be carried out for each image datum. The image datum and the image processing control information may be stored in the same file, or they may be saved in separate files while retaining their association.

The image processing device according to the first aspect of the present invention may further be equipped with second storage unit for storing predetermined image processing control information used in the image processing, wherein:

the image processing unit implements image processing based on the predetermined image processing control information instead of the image processing control information when the work area for the image datum which is the object of the image processing cannot be secured in the storage area. When such a configuration is used, image processing may be carried out based on predetermined image processing control information even if the work area for the image datum cannot be secured.

A second aspect of the present invention provides an image processing device for carrying out image processing using image data and image processing control information used during image processing of the image data as well as associated therewith. The image processing device according to the second aspect of the present invention is characterized by the fact of comprising first storage unit having a storage area with a predetermined capacity used in the image processing; image data acquisition unit for acquiring one image datum from a plurality of image data contained in one output job according to the output sequence for outputting image data; information acquisition unit for acquiring the image processing control information associated with the acquired image datum; gamma correction work area securing unit for securing a gamma correction work area in the storage area in order to implement gamma correction processing on the acquired image datum; and gamma correction processing unit for generating a gamma correction table in the gamma correction work area based on the acquired image processing control information, and carrying out gamma correction processing on the acquired image datum using the generated gamma correction table.

According to the image processing device of the second aspect of the present invention, one image datum is acquired from a plurality of image data contained in one output job, a gamma correction work area is secured in a storage area to implement gamma correction processing on the acquired image datum, a gamma correction table is generated in the gamma correction work area based on the acquired image processing control information, gamma correction processing is carried out on the acquired image datum, and the secured gamma correction work area is released when the gamma correction processing on the image datum is complete, so the work area needed for gamma correction processing may be effectively used. Thus, the amount of memory resources needed for image processing can be decreased, and suitable image processing can be carried out for each image datum. It is also favorable to include gamma correction work area releasing unit to release the secured gamma correction work area when the gamma correction processing on the image datum is complete.

The gamma correction work area securing unit in the image processing device according to the second aspect of the present invention may also acquire different gamma numbers based on the image processing control information associated with each of the plurality of image data contained in one output job, decide the storage capacity to allocate as the gamma correction work area for each image file reflecting the different gamma number, and secure the gamma correction work area based on the determined storage capacity. In this case, the storage capacity to be allocated as the gamma correction work area is decided reflecting the different gamma number, so it is possible to efficiently use the memory resources as well as to maintain gradation reproducibility of the image data.

The gamma correction work area securing unit in the image processing device according to the second aspect of the present invention may also detect the number of image data contained in the main scanning direction which is the movement direction of an output mechanism carrying out the output, decide on the storage capacity to allocate as the gamma correction work area for each image datum reflecting the detected number of image data, and secure the gamma correction work area based on the decided storage capacity. In this case, a storage capacity is decided for allocation as a gamma correction work area reflecting the number of image data contained in the main scanning direction of the output mechanism, and the resolution of the gamma correction table is changed, so it is possible to effectively use the memory resources as well as to realize gradation reproducibility of the image data in response to the number of image data.

The output mechanism in the image processing device according to the second aspect of the present invention may be a print head for carrying out printing or an electron gun for carrying out display.

The gamma correction processing unit in the image processing device according to the second aspect of the present invention may also change the number of gradations in the gamma correction table generated in response to the secured gamma correction area. In this case, it is possible to suitably change the number of gradations in the gamma correction table in response to the capacity of the secured gamma correction area, so a drop in the gradation reproducibility accompanying a decrease in the effective resolution of the image data can be prevented.

The image processing device according to the second aspect of the present invention may further comprise color space conversion work area securing unit to secure a color space conversion work area in the storage area in order to implement color space conversion processing on the acquired image datum, color space conversion processing unit for deciding on a color space conversion matrix based on the acquired image processing control information, applying the decided color space conversion matrix to the image datum to develop the obtained calculation results in the color space conversion work area, and carrying out color space conversion processing on the acquired image datum, and color space conversion work area releasing unit to release the secured color space conversion work area when the color space conversion processing on the image data is complete. In the case of this configuration, it is possible to implement the color space conversion of image data.

The image processing device according to the second aspect of the present invention may further comprise image quality adjustment work area securing unit for securing an image quality adjustment work area in the storage area in order to implement image quality adjustment processing on the acquired image datum, image quality adjustment processing unit for generating an image adjustment table in the image quality adjustment work area based on the acquired image processing control information, and carrying out image quality adjustment processing on the acquired image datum using the generated image quality adjustment table, and image quality adjustment work area releasing unit for releasing the secured image quality adjustment work area when the image quality adjustment processing of the image datum is complete. In the case of such a configuration, it is possible to implement image quality adjustment processing on image data.

The image processing device according to the second aspect of the present invention may further comprise second storage unit for storing a predetermined gamma correction table, and the gamma correction processing unit can implement image processing using the predetermined gamma correction table if the gamma correction work area cannot be secured in the storage area. In the case of such a configuration, even in the case where a work area for creating the gamma correction table cannot be secured, it is possible to implement gamma correction processing using the predetermined gamma correction table.

The image processing device according to the second aspect of the present invention may further comprise second storage unit for storing a predetermined color space conversion matrix, and the color space conversion processing unit can implement image processing using the predetermined color space conversion matrix if the color space conversion work area cannot be secured in the storage area. In the case of such a configuration, even if a work area for carrying out a color space conversion matrix cannot be secured, color space conversion processing can be carried out using the predetermined color space conversion matrix.

The image processing device according to the second aspect of the present invention may further comprise a second storage unit for storing a predetermined image quality adjustment table, and the image quality adjustment processing unit can implement image processing using the predetermined image quality adjustment table if the image quality adjustment work area cannot be secured in the storage area. In the case of such a configuration, even if a work area for creating an image quality adjustment table cannot be secured, image quality adjustment processing can be carried out using the predetermined image quality adjustment table.

A third aspect of the present invention provides an image processing device for carrying out image processing using image data and image processing control information used during image processing of the image data as well as associated therewith. The image processing device according to the third aspect of the present invention is characterized by the fact of comprising storage unit having a storage area with a predetermined capacity used in the image processing, image data number detection unit for detecting the maximum number of image data contained in the main scanning direction which is the movement direction of an output mechanism for carrying out image output, storage area dividing unit for dividing the storage area based on the detected number of image data, acquisition unit for acquiring the image processing control information associated with each image datum along the main scanning direction, image processing unit for using the divided storage area to implement image processing based on the acquired image processing control information on the image datum corresponding thereto, and storage area releasing unit for releasing the used storage area when the image processing on the image datum is complete.

According to the image processing device of the third aspect of the present invention, a storage area is divided based on the maximum number of image data contained in the main scanning direction of an output mechanism, image processing is carried out based on the acquired image processing control information on image data corresponding thereto using the divided storage area, and the used storage area is released when the image processing on the image datum is complete, so it is possible to decrease the amount of memory resources needed for image processing, and suitable image processing can be carried out for each image datum.

A fourth aspect of the present invention provides an image processing device for carrying out image processing using image data and image processing control information used during image processing of the image data as well as associated therewith. The image processing device according to the fourth aspect of the present invention is characterized by the fact of comprising storage unit having a storage area with a capacity smaller than the work area capacity needed for image processing of all the image data contained in one output job, image processing unit for controlling the securing and releasing of the work area needed for image processing of one image datum in the storage area as well as carrying out image processing on all the image data contained in one output job, and image data transmission unit for transmitting image data which has undergone the image processing.

According to the image processing device of the fourth aspect of the present invention, the securing and releasing of the work area needed for image processing on one image datum in a storage area with a capacity smaller than the work area capacity needed for image processing of all the image data contained in one output job is controlled, and image processing is carried out on all of the image data contained in one output job, so it is possible to decrease the amount of memory resources needed for image processing as well as to implement suitable image processing for each image datum.

A fifth aspect of the present invention provides a computer readable medium storing an image processing program codes for using image processing control information used during image processing of the image data as well as associated therewith to implement image processing on image data corresponding to an output job containing a plurality of the image data. The image processing program codes on a computer readable medium according to the fifth aspect of the present invention is characterized by the fact of causing a computer to implement a function for securing a work area in a storage area having a predetermined capacity in the storage unit in order to implement the image processing, and for carrying out image processing on the image data for each image datum using the image processing control information; a function for transmitting image data having undergone the image processing; and a function for releasing the secured work area for each image datum when the image processing on the image data is complete.

According to the computer readable medium of the fifth aspect of the present invention, a work area for carrying out image processing is secured in a storage area having a predetermined capacity in the storage unit corresponding to an output job containing a plurality of image data, image processing on image data is carried out for each image datum based on acquired image processing control information, and the secured work area is released for each image datum when the image processing on the image datum is complete, so it is possible to decrease the amount of memory resources required for image processing and suitable image processing can be carried out for each image datum.

A sixth aspect of the present invention provides a computer readable medium storing an image processing program codes for carrying out image processing using image data and image processing control information used during image processing of image data as well as being associated therewith. The image processing program codes on the computer readable medium according to the sixth aspect of the present invention is characterized by the fact of causing a computer to implement a function for acquiring one image datum from a plurality of image data contained in one output job according to the output sequence for outputting image data, a function for acquiring the image processing control information associated with the acquired image data, a function to secure a work area in a storage area of the first storage unit in order to implement image processing on the acquired image data, a function for carrying out image processing on the acquired image data based on the acquired image processing control information using the secured work area, and a function for releasing the secured work area when the image processing on the image data is complete to be realized by a computer.

According to the computer readable medium of the sixth aspect of the present invention, operation effects similar to those of the image processing device according to the first aspect of the present invention can be obtained. Also, the computer readable medium according to the sixth aspect of the present invention may be realized in a variety of aspects similar to the image processing device according to the first aspect of the present invention.

A seventh aspect of the present invention provides a computer readable medium storing an image processing program codes for carrying out image processing using image data and image processing control information used during image processing of the image data as well as associated therewith. The image processing program codes on the computer readable medium according to the seventh aspect of the present invention is characterized by the fact of causing a computer to implement a function for acquiring one image datum from a plurality of image data contained in one output job according to an output sequence for outputting the image data, a function for acquiring the image processing control information associated with the acquired image data, a function for securing a gamma correction work area in a storage area of first storage unit in order to implement gamma correction processing on the acquired image data, a function to generate a gamma correction table in the gamma correction work area based on the acquired image processing control information and carrying out gamma correction processing on the acquired image data using the generated gamma correction table, and a function for releasing the secured gamma correction work area when the gamma correction processing on the image data is complete to be realized by a computer.

According to the computer readable medium of the seventh aspect of the present invention, it is possible to obtain operation effects similar to those of the image processing device according to the second aspect of the invention. Also, the computer readable medium according to the seventh aspect of the present invention may be realized in a variety of aspects similar to the image processing device according to the seventh aspect of the present invention.

An eighth aspect of the present invention provides a computer readable medium storing an image processing program codes for carrying out image processing using image data and image processing control information used during image processing of the data as well as being associated therewith. The image processing program codes on the computer readable medium according to the eighth aspect of the present invention is characterized by the fact of causing a computer to implement a function for detecting the maximum number of image data contained in a main scanning direction which is the movement direction of an output mechanism for carrying out image output, a function for dividing the storage area of storage unit based on the detected number of image data, a function for acquiring the image processing control information associated with each of the image data along the main scanning direction, a function to implement image processing on the image data using the acquired image processing control information by using the divided storage area, and a function for releasing the used storage area when the image processing of the image data is complete to be realized by a computer.

According to the computer readable medium of the eighth aspect of the present invention, operation effects similar to those of the image processing device according to the third aspect of the present invention can be obtained. Also, the computer readable medium according to the eighth aspect of the present invention may be realized in a variety of aspects similar to the image processing device according to the third aspect of the present invention.

A ninth aspect of the present invention provides a computer readable medium storing an image processing program codes for carrying out image processing using image data and image processing control information used during image processing of the image data as well as associated therewith. The image processing program codes on the computer readable medium according to the ninth aspect of the present invention is characterized by the fact of causing a computer to implement a function for controlling the securing and releasing of a work area needed for image processing of one image datum from a storage area with a capacity smaller than that of a work area needed for image processing of all the image data contained in one output job in storage unit as well as for carrying out image processing on all the image data contained in one output job, and a function for transmitting image data which has undergone the image processing to be realized by a computer.

According to the computer readable medium of the ninth aspect of the present invention, operation effects similar to those of the image processing device according to the fourth aspect of the present invention can be obtained. Also, the computer readable medium according to the ninth aspect of the present invention may be realized in a variety of aspects similar to the image processing device according to the fourth aspect of the present invention.

A tenth aspect of the present invention provides an output device for using image processing control information used during image processing of image data as well as being associated therewith to output an image corresponding to a printing output containing a plurality of the image data. The printing device according to the tenth aspect of the present invention is characterized by the fact of comprising storage unit having a storage area with a predetermined capacity used in image processing of the image data; image processing unit for securing a work area in the storage area for carrying out the image processing, and for carrying out image processing on the image data using image processing control information associated with the image data for each image datum; and work area releasing unit for releasing the secured work area for each image datum when image processing on the image datum is complete.

According to the output device of the tenth aspect of the present invention, in response to an output job containing a plurality of image data, a work area for carrying out image processing is secured in a storage area with a predetermined capacity in storage unit, image processing on the image data is carried out for each image datum based on image processing control information associated with the image data, the secured work area is released for each image datum when the image processing of the image datum is complete, and the image datum is printed, so it is possible to decrease the amount of memory resources required for image processing, and suitable image processing may be carried out on each image datum to print it.

An eleventh aspect of the present invention provides an image processing device for carrying out image processing using image data and image processing control information used during image processing of image data and associated therewith. The image processing device according to the eleventh aspect of the present invention is characterized by the fact of comprising a detection unit for detecting the number of image data contained in one output job, dividing unit for dividing the storage area in storage unit based on the detected number of imaged data, acquisition unit for acquiring the image processing control information associated with each of the image data, and image processing unit for carrying out image processing on the image data using the acquired image processing control information by using the divided storage area.

According to the image processing device of the eleventh aspect of the present invention, a storage area in storage unit is divided based on the number of image data contained in one output job, and image processing on all the image data contained in one output job is carried out using the divided storage area, so it is possible to decrease the amount of memory resources required for image processing, and suitable image processing may be carried out on each image datum.

The eleventh aspect of the present invention may be realized as a computer readable medium on which an image processing program is recorded.

Also, the computer readable medium on which any of the programs is recorded may be realized as a program or a method.

FAVORED EMBODIMENTS FOR WORKING THE INVENTION

Figure 1:
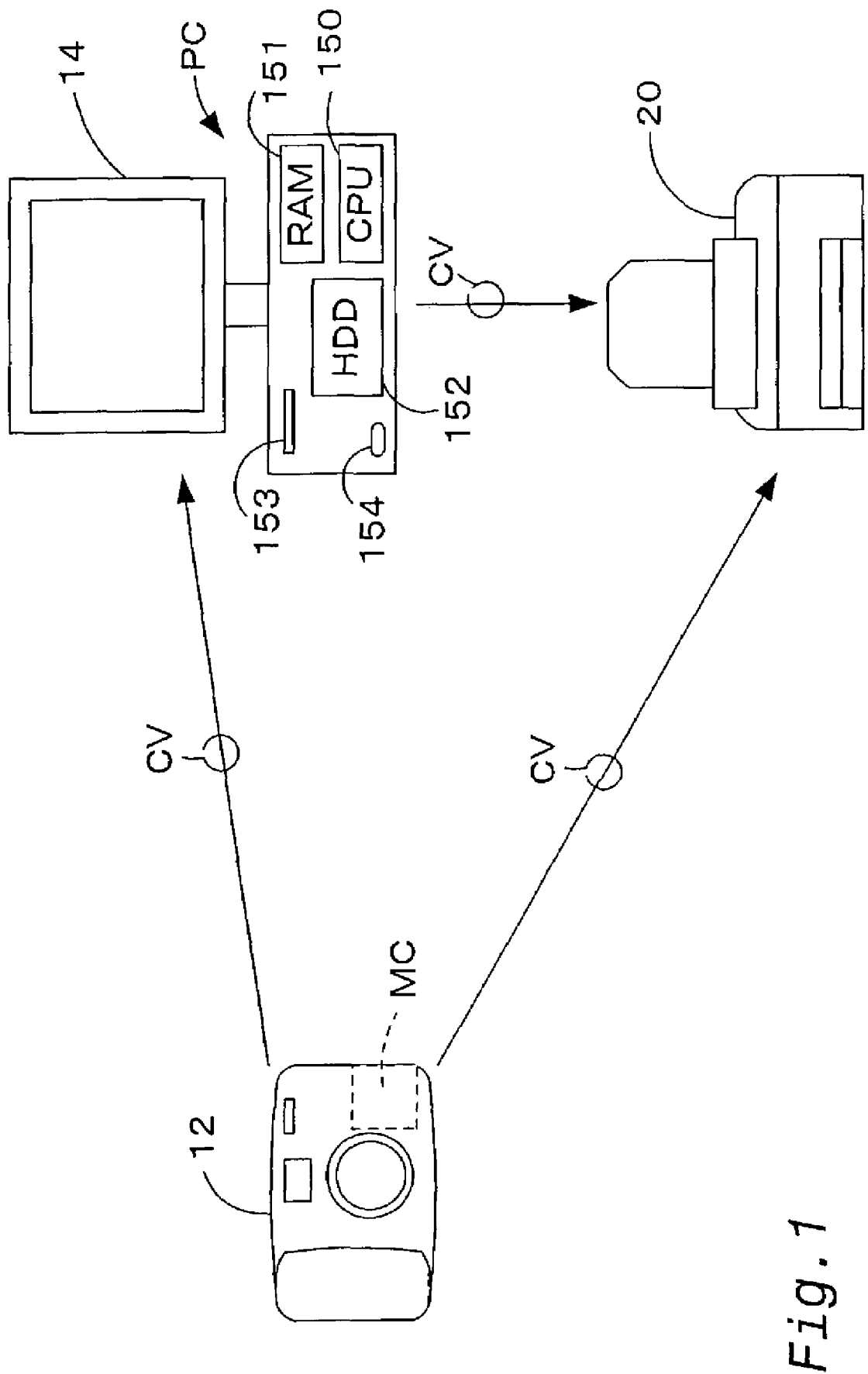
FIG. 1 is an explanatory view showing one example of an image processing system to which the image processing device according to the present embodiments may be applied.
Figure 2:
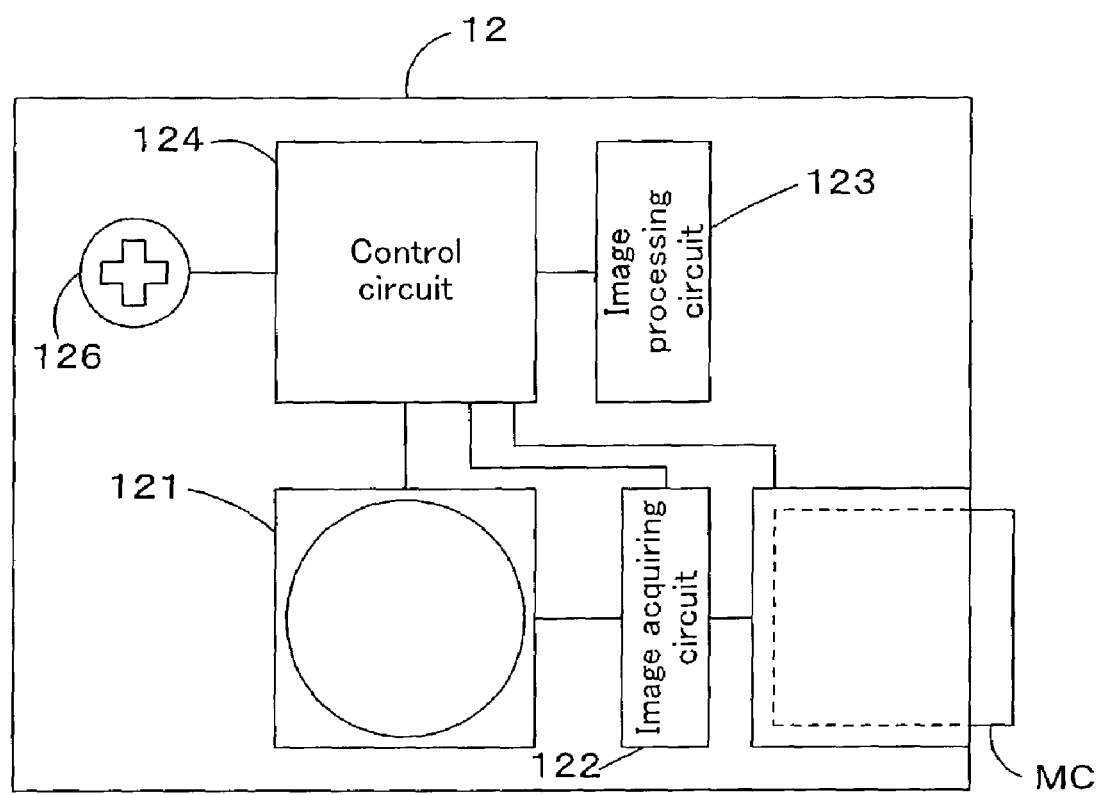
FIG. 2 is a block diagram showing an outline configuration of a digital still camera capable of generating an image file (image data) processed by the image processing device according to the present embodiments.
Figure 3:
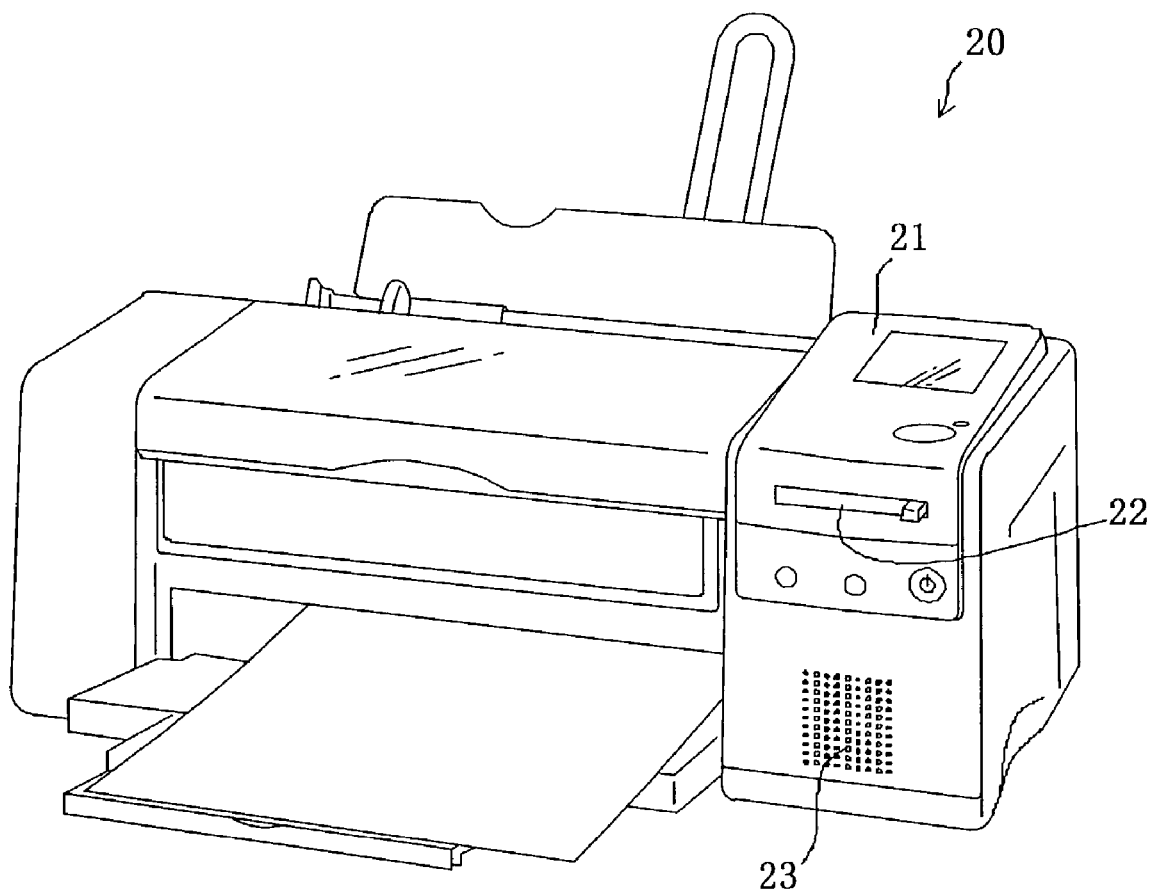
FIG. 3 is an explanatory view showing the outside of a stand-alone color printer as the image processing device and the printing device according to the present embodiments.
Figure 4:
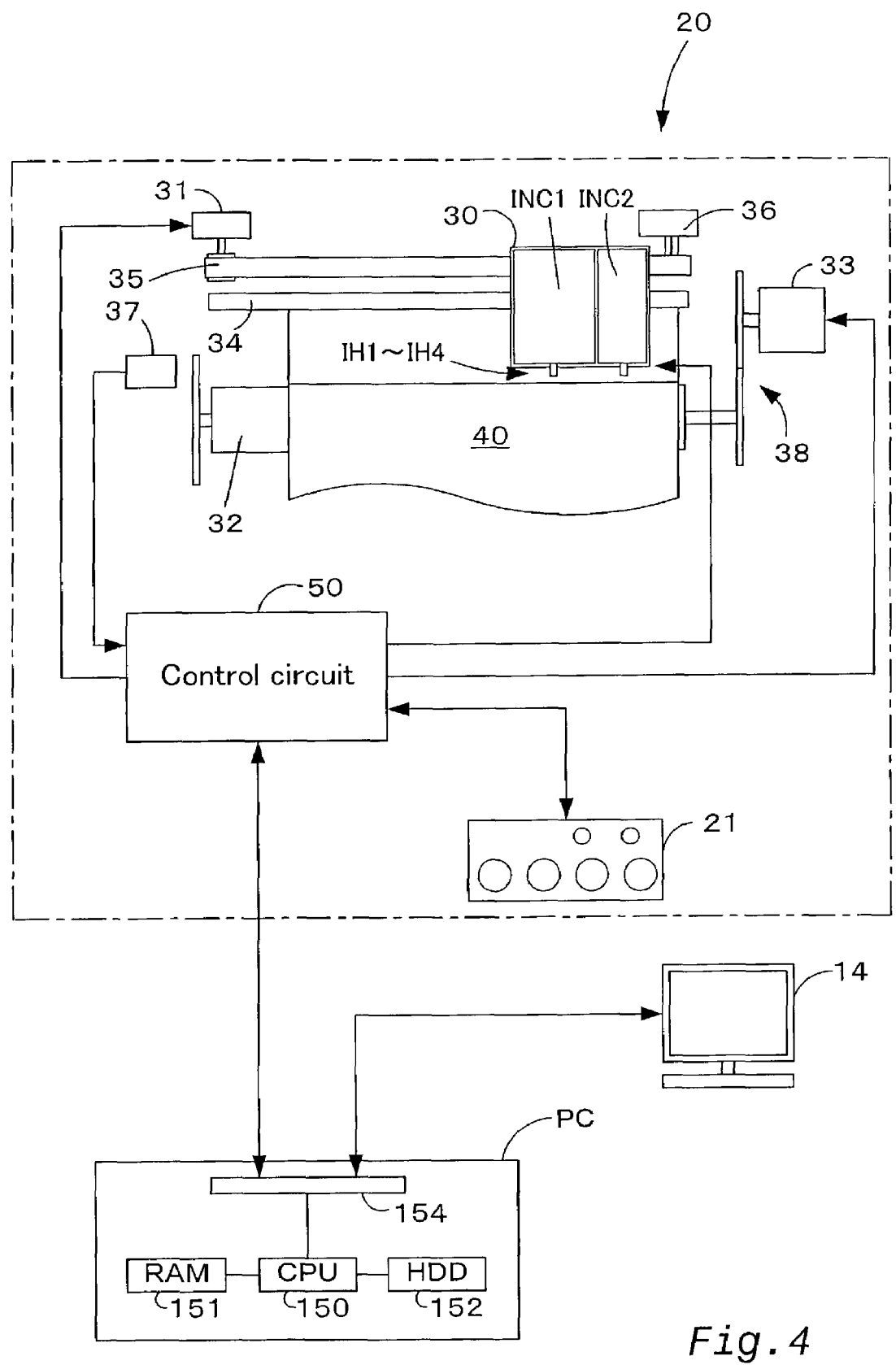
FIG. 4 is an outline view showing the internal configuration of a color printer according to the present embodiments.
Figure 5:
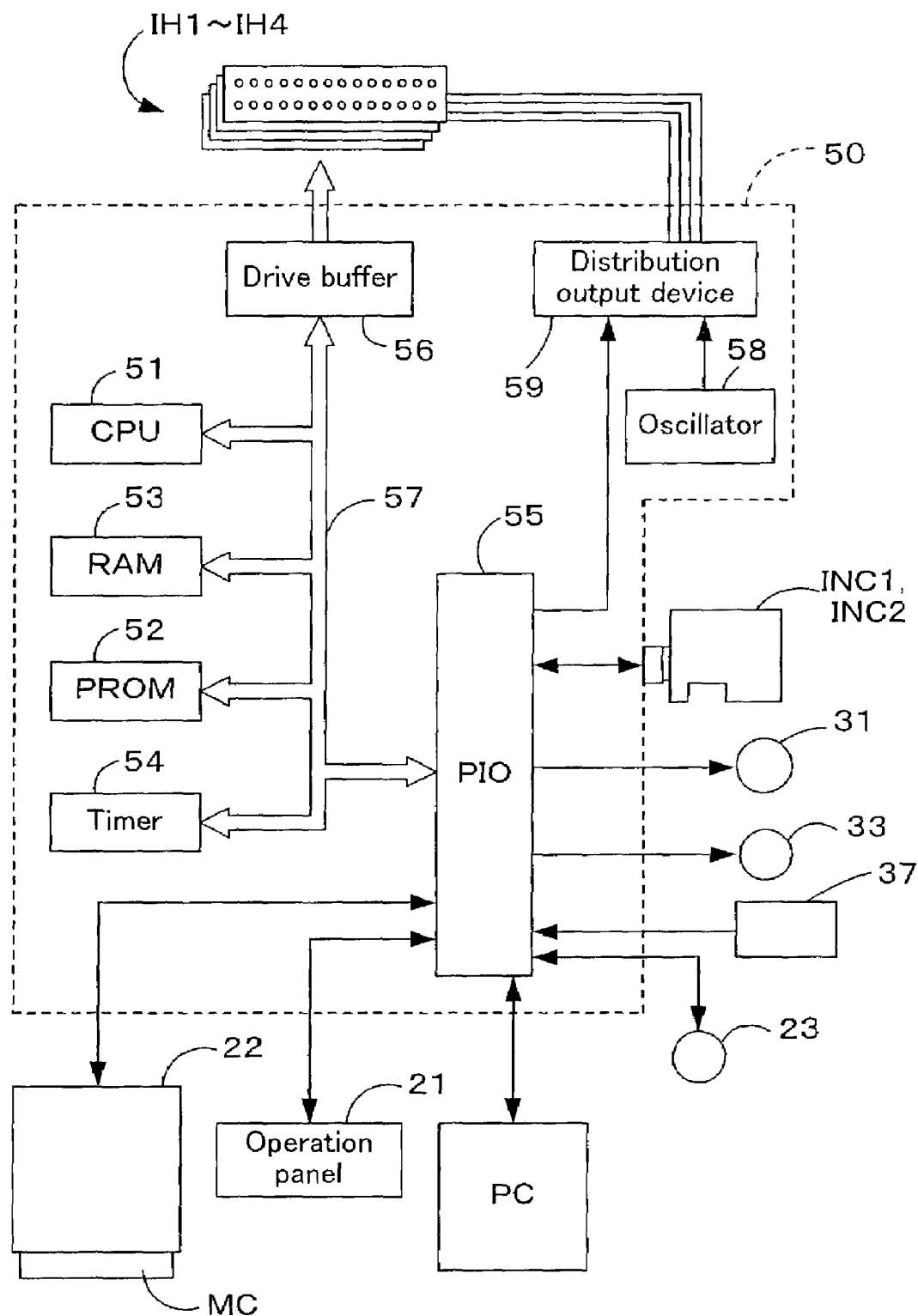
FIG. 5 is a block view showing the internal configuration of a control circuit of a color printer 20 according to the present embodiments.

The image processing device according to the present invention is described below in the following sequence based on a number of embodiments while referring to the Drawings;
A. The configuration of the image processing system;
B. The image file configuration;
C. Image processing by the image processing device;
D. Other embodiments
A. The configuration of an image processing system to which the image processing device according to the present embodiments may be applied is described with reference to FIGS. 1 to 4. FIG. 1 is an explanatory view showing one example of an image processing system to which the image processing device according to the present embodiments may be applied. FIG. 2 is a block view showing an outline configuration of a digital still camera capable of generating an image file (image data) for output by the image processing device according to the present embodiments. FIG. 3 is an explanatory view showing the outside of a stand-alone type color printer as an image processing device and a printing device in the present embodiments. FIG. 4 is an outline view showing the internal configuration of a color printer which may be applied to the present embodiments. FIG. 5 is a block view showing the internal structure of a control circuit for the color printer 20.

An image processing system 10 comprises a digital still camera 12 as an input device for generating an image file, a personal computer PC which may function as an image processing device for carrying out image processing based on the image file generated by the digital still camera 12 and for outputting printing image data, and a color printer 20 functioning as an image processing device and a printing device. In the present embodiments, the stand-alone type printer, not the personal computer PC, is used as the image processing device. In the case where the personal computer PC functions as the image processing device, a CRT display, LCD display or other such monitor 14, a projector or the like may be used as the output device.

The personal computer PC is a computer of the type generally used, and is equipped with a CPU 150 for executing an image processing program according to the present invention, a RAM 151 for temporarily storing operation results, image data, etc., from the CPU 150, and a hardware disk drive (HDD) 152 storing an image processing program. The personal computer PC is equipped with a card slot 153 for loading a memory card MC and an input/output terminal 154 for connecting a connection cable from the digital still camera 12 or the like.

As shown in FIG. 2, the digital still camera 12 is for acquiring images by causing optical information to form an image in a digital device (a CCD or photomultiplier tube), and is equipped with an optical circuit 121 comprising a CCD or the like for collecting optical information as shown in FIG. 2, an image acquisition circuit 122 for controlling the optical circuit 121 and acquiring images, an image processing circuit 123 for processing acquired digital images, and a control circuit 124 equipped with a memory for controlling circuits. The digital still camera 12 saves acquired images as digital data to the memory card MC as a storage device. The save format of the image data in the digital still camera 12 is generally JPEG, but other save formats such as TIFF, GIF, BMP and RAW data may also be used.

The digital still camera 12 is also equipped with a selection/decision button 126 for setting the filming mode, for which a plurality of image processing control parametric values are set beforehand, in response to filming conditions as well as individual image processing control parameters such as brightness, contrast, exposure adjustment quantity (exposure adjustment value) and white balance; and a liquid crystal display 127 for previewing filmed images and setting the filming mode and the like using the selection/decision button 126.

The digital still camera 12 used in the present image processing system stores, in addition to image data GD, image processing control information GC for the image data as an image file GF in the memory card MC. More specifically, along with the image data GD at the time of filming, the image processing control information GC is automatically stored in the memory card MC as information automatically composing an image file GF.

The image file GF generated by the digital still camera 12 is transmitted to the color printer 20 through, for example, a cable CV and the computer PC, or through the cable CV. Alternately, the image file is transmitted to the color printer 20 through a connection via the computer PC in which the memory card MC on which the digital still camera 12 stored the image file is inserted in the memory slot, or by a direct connection of the memory card MC to the printer 20. The description below will be made based on the case where the memory card MC is connected or directly so to the color printer 20.

The configuration of the color printer 20 according to the present embodiments will be described with reference to FIG. 3. The color printer 20 is a stand-alone type not needing the personal computer PC during image processing or print processing, and is equipped with an operation panel 21 for setting the printing paper, print resolution, print layout and the automatic image quality adjustment; and a memory card slot 22 with the memory card MC loaded, and having an interface function for reading and writing the recorded image file GF. A speaker 23 for carrying out voice guidance for printing operations may also be provided.

The internal configuration of the color printer 20 functioning as the image processing device and the image output device according to the present embodiments will be described while referring to FIG. 4. The color printer 20 is capable of outputting color images, for example, a jet ink type printer which sprays inks having the four colors of cyan (C), magenta (M), yellow (Y) and black (K) to form an image through the formation of a dot pattern. Alternately, the color printer 20 may be an electrophotographic type which transfers/fixes color toner on a printing medium to form images. Instead of the four colors, the color inks light cyan (LC), light magenta (LM), and dark yellow (DY) may be used. An ink jet type printer will be used as an example in the below description.

As illustrated, the color printer 20 comprises a mechanism for driving print heads IH1 to IH4 mounted on a carriage 30 and expelling ink or forming dots; a mechanism for moving the carriage 30 back and forth in the axial direction of a platen 32 using a carriage motor 31; a mechanism for feeding a cut paper 40 for printer using a paper feed motor 33; and a control circuit 50. The mechanism for moving the carriage 30 back and forth in the axial direction of the platen 32 comprises a sliding shaft 34 for holding the carriage 33 provided parallel to the axis of the platen 32, a pulley 36 holding between itself and the carriage motor 31 an endless drive belt 35, and the like.

The control circuit 50 appropriately controls the movement of the paper feed motor 33, the carriage motor 31, and the print heads IH1 to IH4 while exchanging signals with the operation panel 21 of the printer. An ink cartridge INC1 and an ink cartridge INC2 are loaded in the carriage 30. Black (K) ink is held in the ink cartridge INC1, and other inks, or more specifically, the three colors of ink cyan (C), magenta (M), and yellow (Y), are held in the ink cartridge INC2. As described above, light cyan (LC), light magenta (LM) and light yellow (LY) inks may also be used.

Next is a description of the internal configuration of the control circuit 50 in the color printer 20 with reference to FIG. 5. As illustrated, a CPU 51, a PROM 52, a RAM 53, a peripheral device input/output portion (PIO) 54, a timer 55, a drive buffer 56, and the like are provided inside the control circuit 50. The personal computer PC, the operation panel 21, the memory card slot 22, the speaker 23, the carriage motor 31, the paper feed motor 33, and an encoder 37 are connected to the PIO 54. The drive buffer 56 is used as a buffer for supplying dot-formation ON/OFF signals to the print heads IH1 to IH4. These are mutually connected with a bus 57, making the mutual exchange of data possible. Also, an oscillator 58 for outputting drive waveforms at a predetermined frequency, and a distribution output device 59 for distributing outputs from the oscillator 58 to the ink heads IH1 to IH4 for expelling ink with a predetermined timing are provided in the control circuit 50. The control circuit 50 outputs dot data to the driver buffer 56 using a predetermined timing while keeping in synch with movements of the paper feed motor 33 and the carriage motor 31.

B. The Image File Configuration

Figure 6:
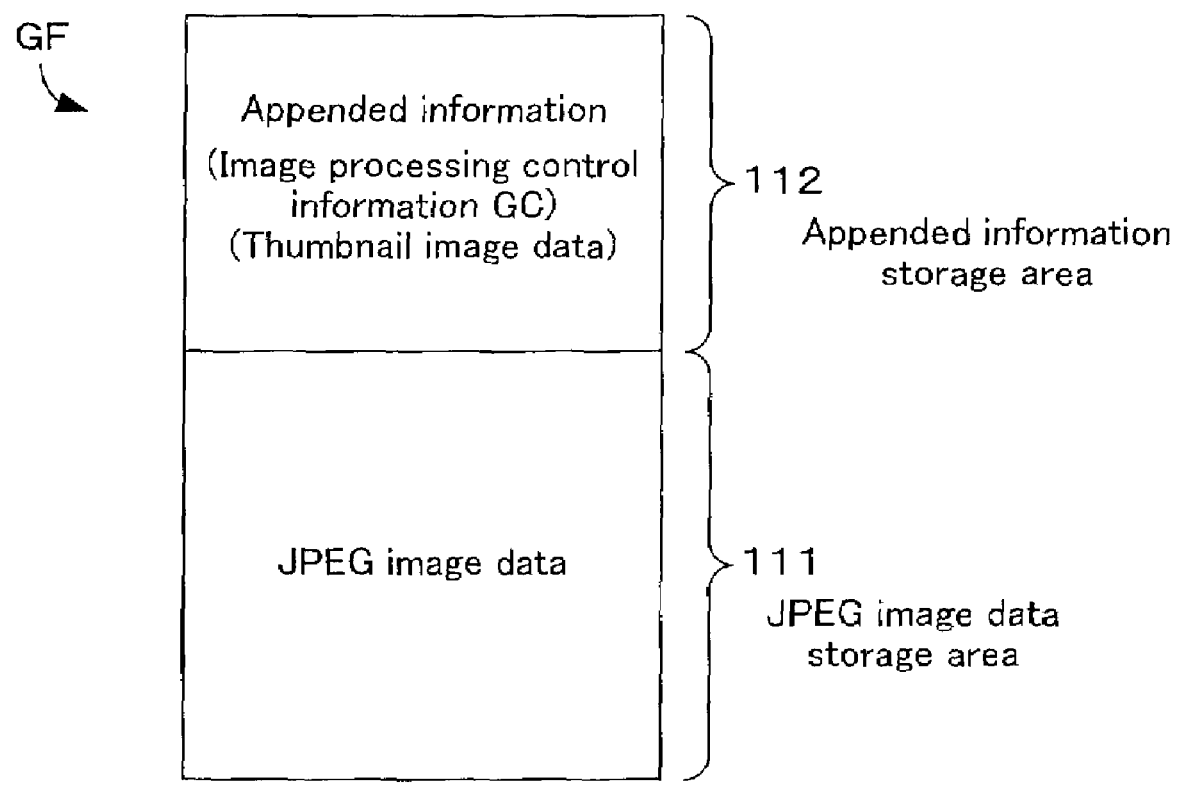
FIG. 6 is an explanatory view showing a sketch of the internal configuration of an image file GF stored in an Exif file format which may be used in the present embodiments.

A sketch of the configuration of an image file that can be used in the present embodiments will be described with reference to FIG. 6. FIG. 6 is an explanatory view conceptually showing one example of an internal configuration of the image file that can be used in the present embodiments. The image file GF according to the present embodiments can have a file structure conforming, for example, to the image file format standards (Exif) for digital still cameras. The specifications of Exif files are established by the JEITA (Japan Electronics and Information Technology Industries Association).

As an Exif file, the image file GF comprises a JPEG image data storage area 111 for storing image data in a JPEG format, and appended information storage area 112 for storing various information relating to the stored JPEG image data. The filming data and time, exposure, shutter speed, white balance, exposure correction value, target color space and other image processing control information GC referred to when outputting a JPEG image are stored in the appended information storage area 112. Thumbnail image data for the JPEG image stored in the JPEG image data storage area 111 are also stored in a TIFF format in the appended information storage area 112 in addition to the image processing control information GC. As is well known to persons skilled in the art, tags are used to specify data in Exif formatted files, and each datum may be called by the tag name. Terms such as file construction, data construction and storage area in the present embodiments mean the file or data image in a state where the file, data or the like is stored in the storage device.

The image processing control information GC is related to the image quality when the image data is generated (when filming occurs) by an image data generation device such as the digital still camera 12, and parameters relating to the exposure time, the ISO sensitivity, the aperture, the shutter speed and the focus distance which may be arbitrarily set by the user or automatically when filming, or image processing control parameters such as the exposure correction value, the white balance, the filming mode, and the target color space which may be arbitrarily set by the user may also be included.

In addition to the digital still camera 12, the image file GF according to the present embodiments may be generated by a digital video camera, scanner or other input device (image file generation device).

C. Image Processing by the Image Processing Device

Figure 7:
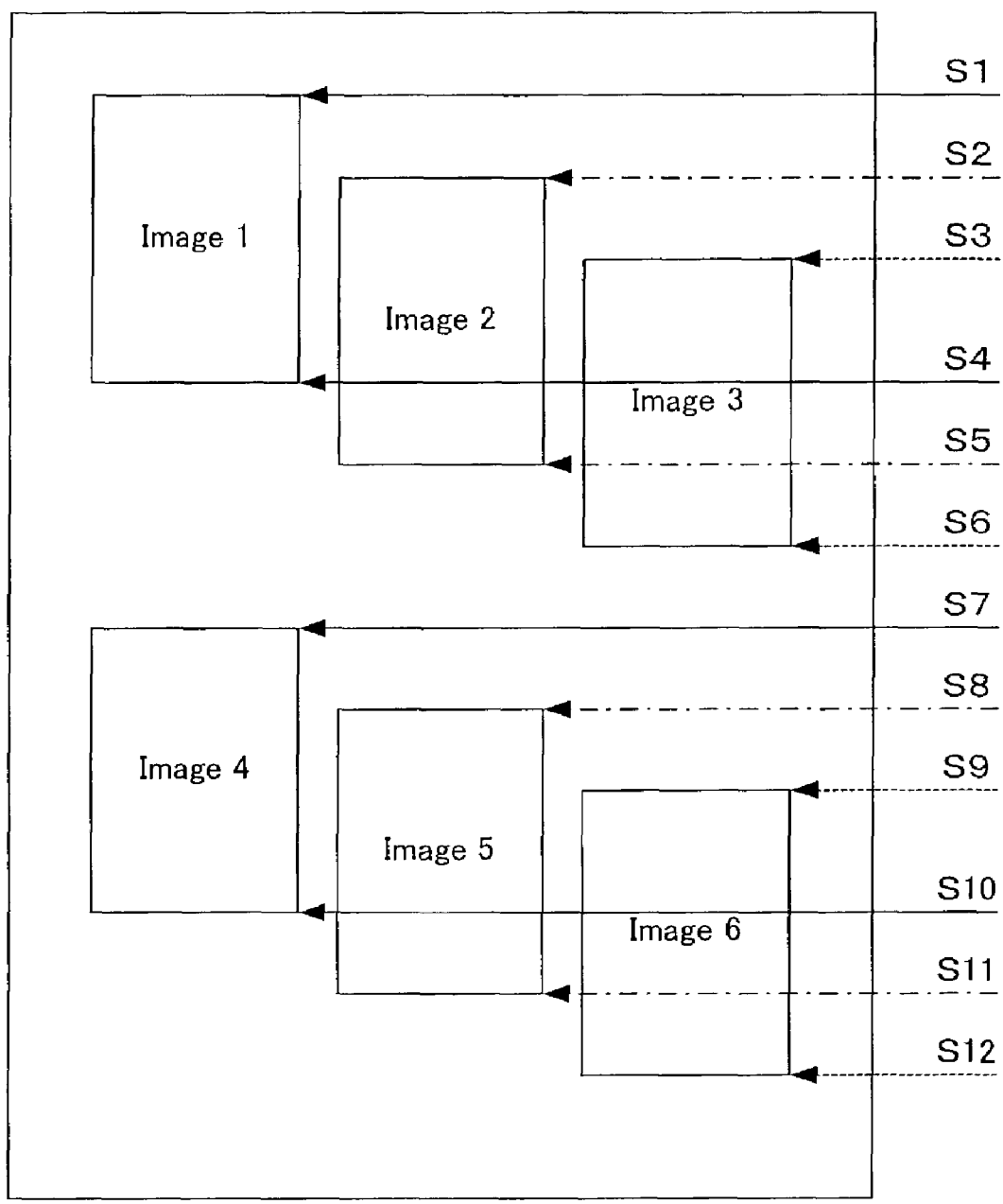
FIG. 7 is an explanatory view showing an image data layout and the securing and release timing of memory resources.
Figure 8:
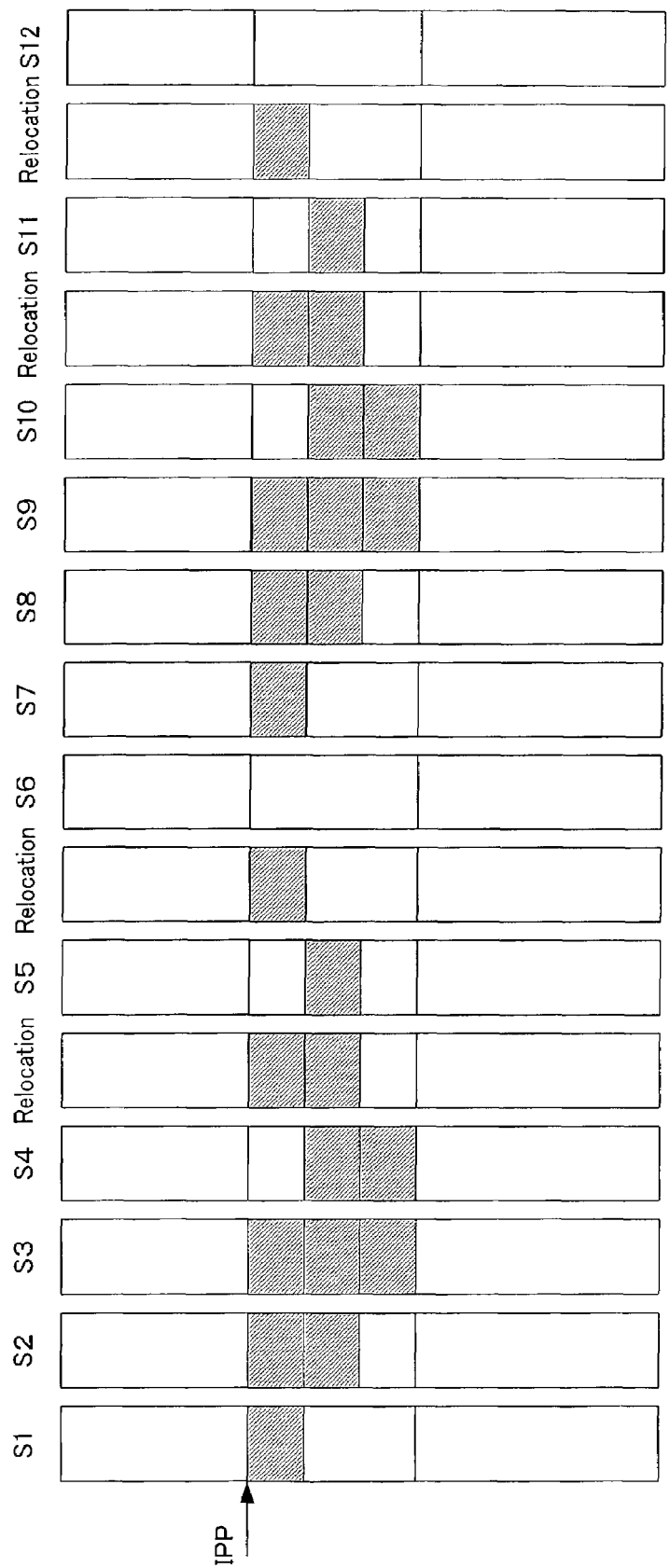
FIG. 8 is an explanatory view conceptually showing the processing flow of the securing and releasing of memory resources in a RAM.

An outline of image processing by the color printer 20 which functions as the image processing device according to the present embodiments is described with reference to FIG. 7 and FIG. 8. FIG. 7 is an explanatory view showing the layout of image data, and the timing of the securing and release of memory resources. FIG. 8 is an explanatory view conceptually showing the processing flow of the securing and releasing of memory resources in a RAM.

The color printer 20 according to the present embodiments can implement printing with a plurality of image file GFs (image data GC) laid out on one printing sheet as well as being able to implement image processing including gamma correction processing, large color space conversion processing, inverse gamma correction processing and automatic image quality adjustment processing on the image data GD based on the image processing control information GC. As shown in FIG. 7, image processing is carried out on the six image data GD based on the respective image processing control information GC when six image data are laid out on one printing sheet, and the amount of memory resources needed for image processing thus increases. In particular, the amount of loaded memory is limited with a stand-alone type printer such as the color printer 20 according to the present embodiments, and the amount of memory resources that can be used in image processing is limited. The amount of memory resources needed for image processing on one image datum GD is not large, and this can be adequately accommodated for with the amount of memory resources loaded depending on the number of image files that is the target of the image processing.

With the color printer 20 according to the present embodiments, all of the image processing memory resources for image processing on the image data GD parallel to the main scanning direction which is the direction of movement (the printing direction on the printing paper) of the printing heads IH are allocated, the amount of memory resources for the respective lined up image data GD is secured, and as the image processing completes, the memory resources are released. For example, as shown in FIG. 7 and FIG. 8, the CPU 51 secures memory resources (a work area and a storage area) for the image processing of an image datum 1 in the storage area of the RAM 151 (S1), and secures a work area for the image processing of an image datum 2 in the storage area of the RAM 53 (S2). The CPU 51 further secures a work area for the image processing of an image datum 3, the last datum lined up in the main scanning direction, in the storage area of the RAM 53 (S3), and releases the memory resources secured in S1 when the image processing of the image datum 1 is complete (S4).

When the memory resources for the image datum 1 are released, the CPU 51 redistributes the memory resources, and when the image processing of the image datum 2 is complete, releases the memory resources secured in S2 (S5). When the memory resources for the image datum 2 are released, the CPU 51 redistributes the memory resources, and when the image processing of the image datum 3 is complete, releases the memory resources secured in S3 (S6). As shown in FIG. 8, the CPU 51 implements the securing and release processing of memory resources for the image data 4 to 6 included in one print job (output job) in the same sequence as S1 to S6 and implements the relocation of the memory resources (S7 to S11), and at the end, all of the memory resources in the storage area of the RAM 53 are released (S12).

As will be appreciated from FIG. 8, an amount of memory resources corresponding to the three image data GD lined up in the main scanning direction may be used in image processing by the color printer 20 according to the present embodiments to implement image processing on the six image data GD contained in one printing job (output job). Thus, even when a plurality of image data are outputted on one printing sheet, it is possible to implement individual image processing based on the image processing control information GC for all the image data GD contained in one printing job with, at the most, the amount of memory resources corresponding to the number of image data GD lined up in the main scanning direction. Also, even if the amount of memory resources is limited, it is possible to use them effectively.

Figure 9:
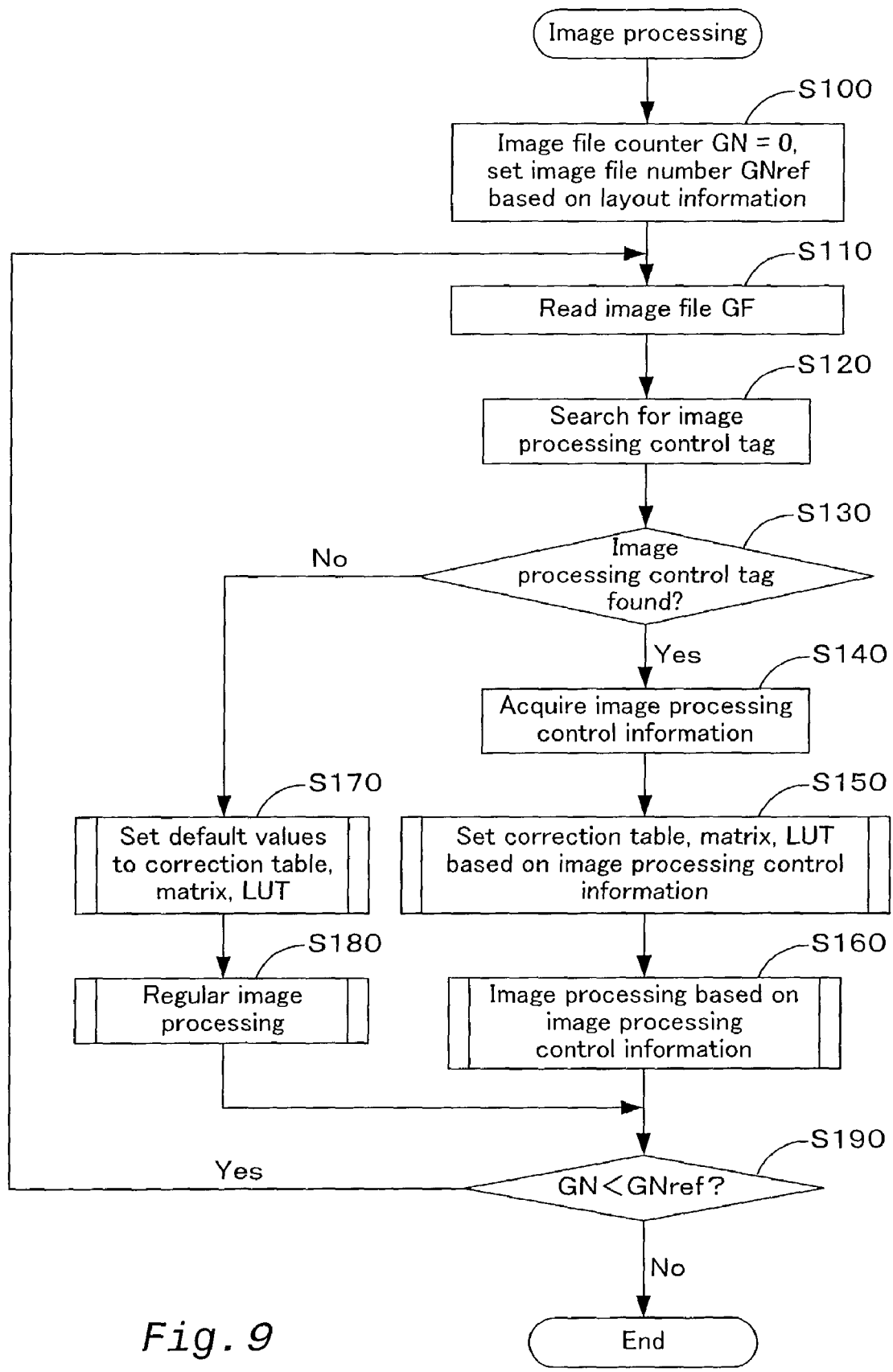
FIG. 9 is a flow chart showing the processing routine for image processing in the color printer 20 according to the present embodiments.
Figure 10:
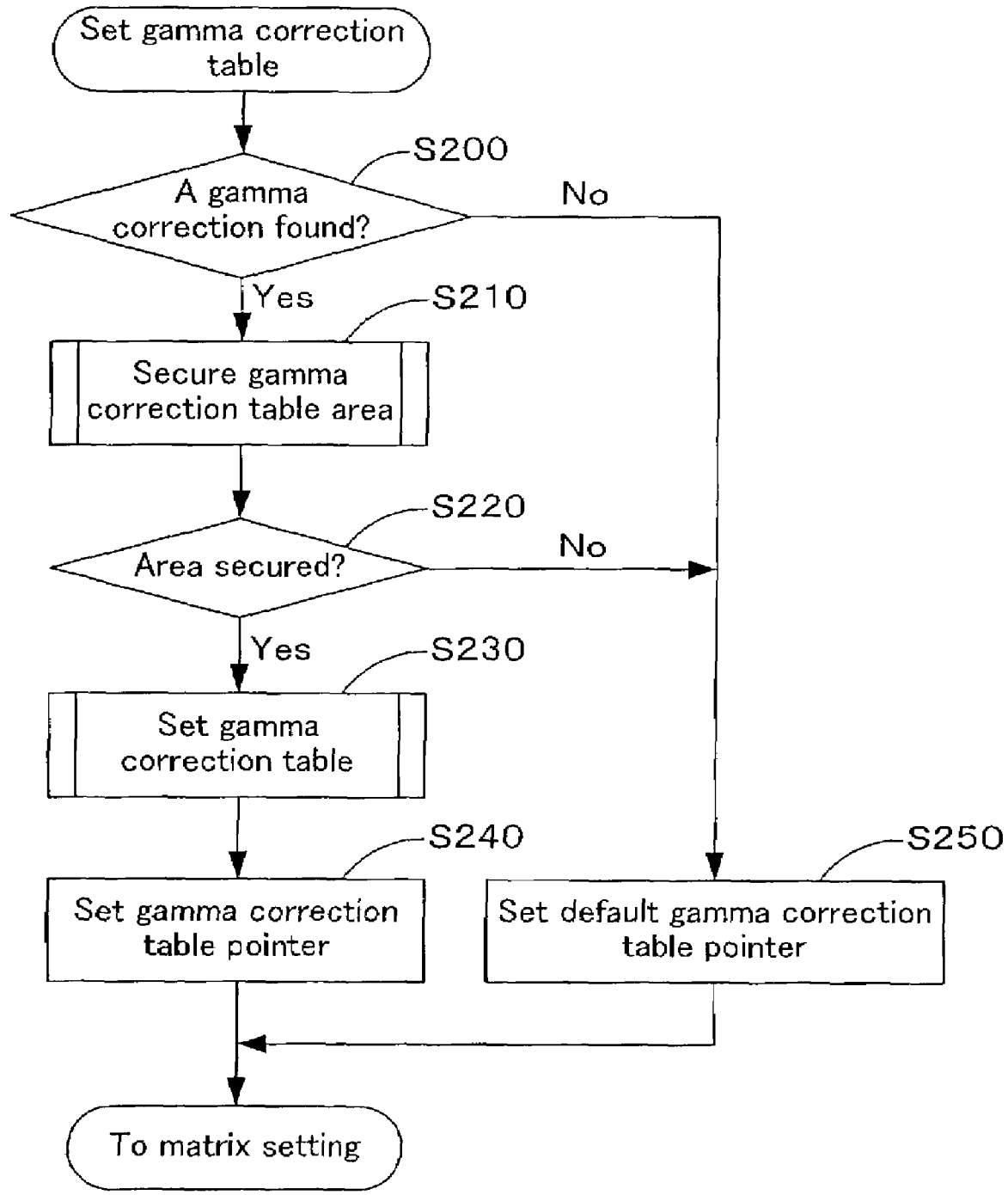
FIG. 10 is a flow chart showing the processing routine for gamma correction table set-up processing in the color printer 20 according to the present embodiments.
Figure 11:
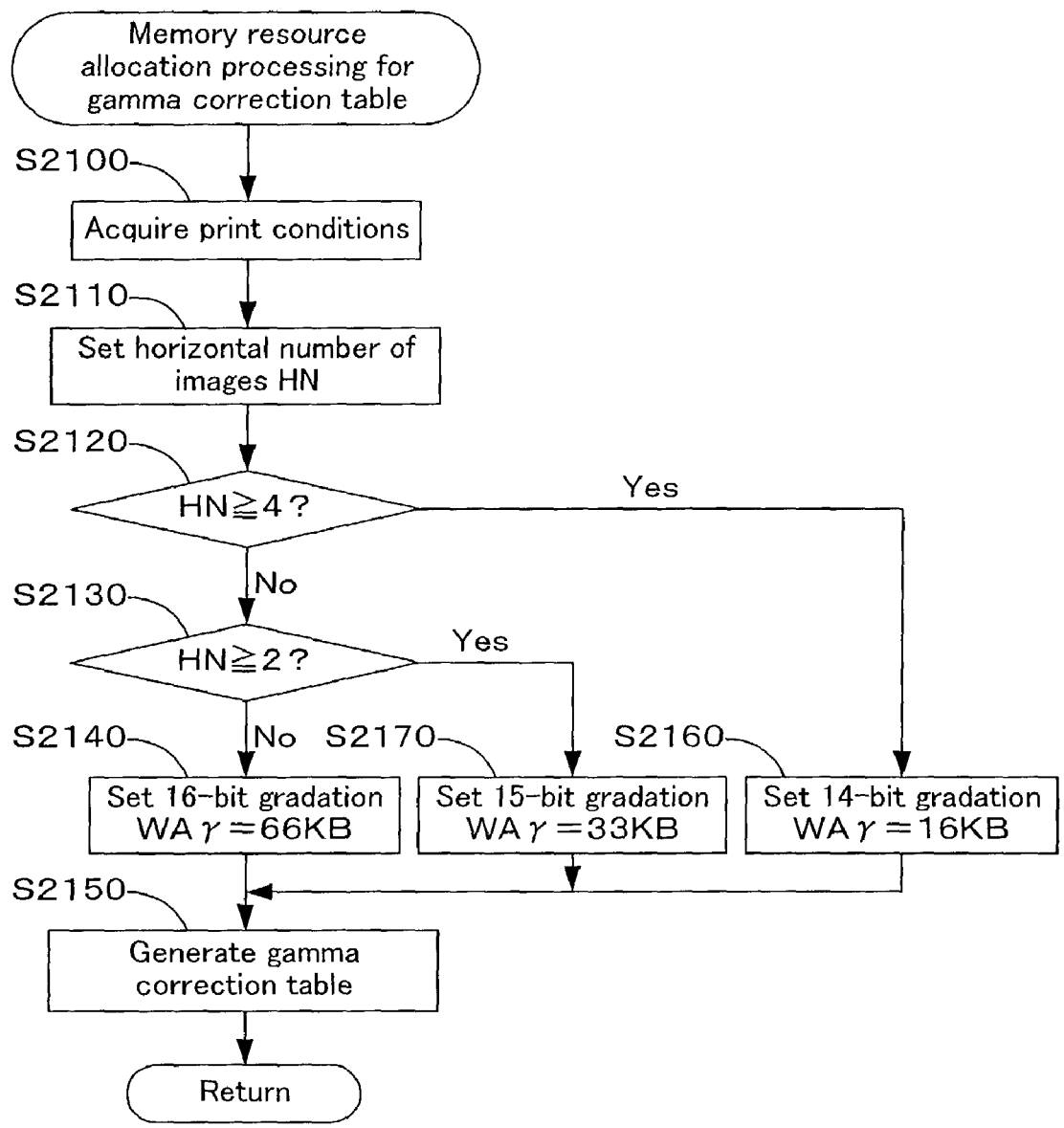
FIG. 11 is a flow chart showing the processing routine for memory resource allocation processing for a gamma correction table in the color printer 20 according to the present embodiments.
Figure 12:
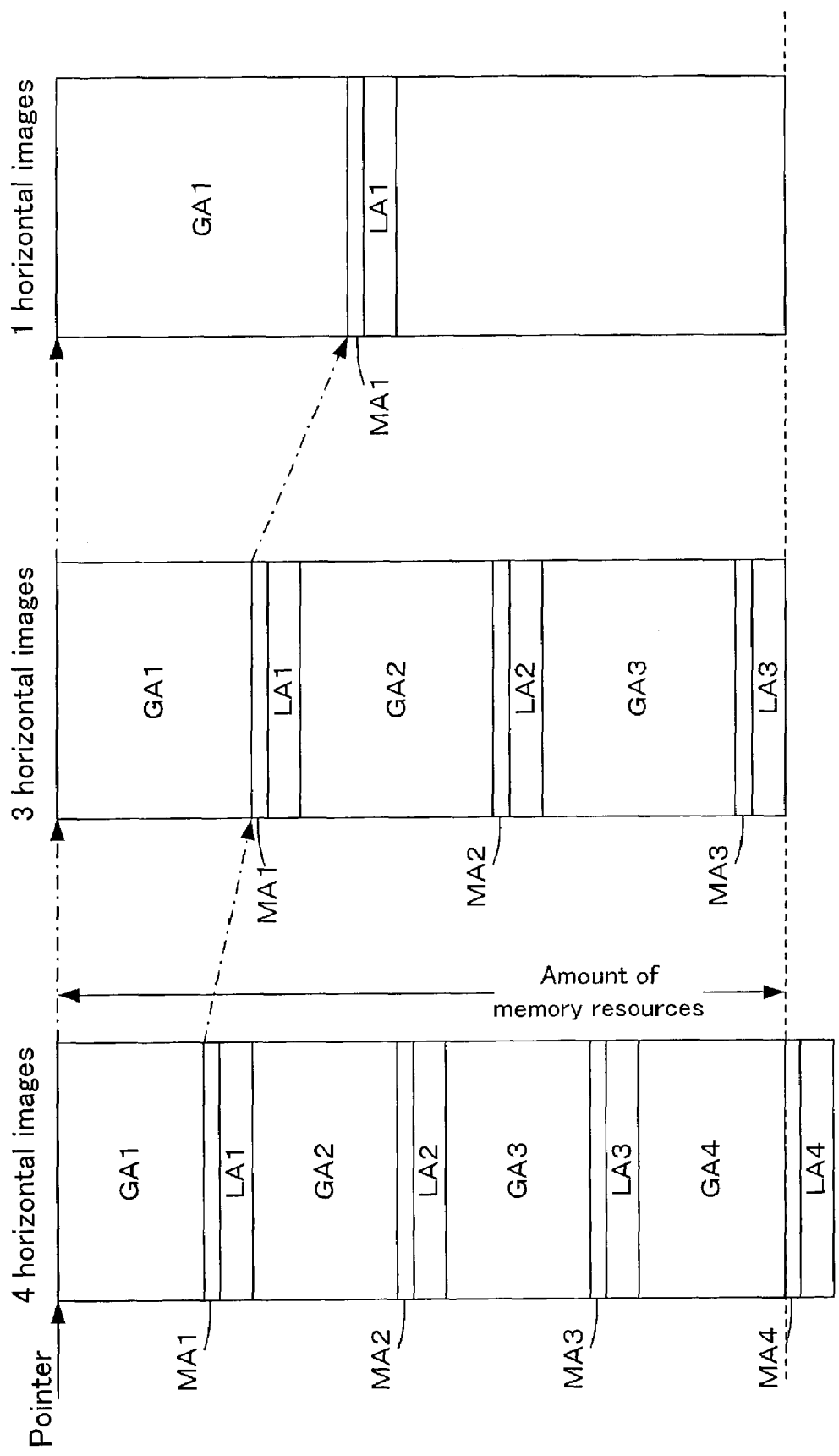
FIG. 12 is an explanatory view showing the condition where the amount of allocation of memory resources for a gamma correction table changes according to the number of image data.
Figure 13:
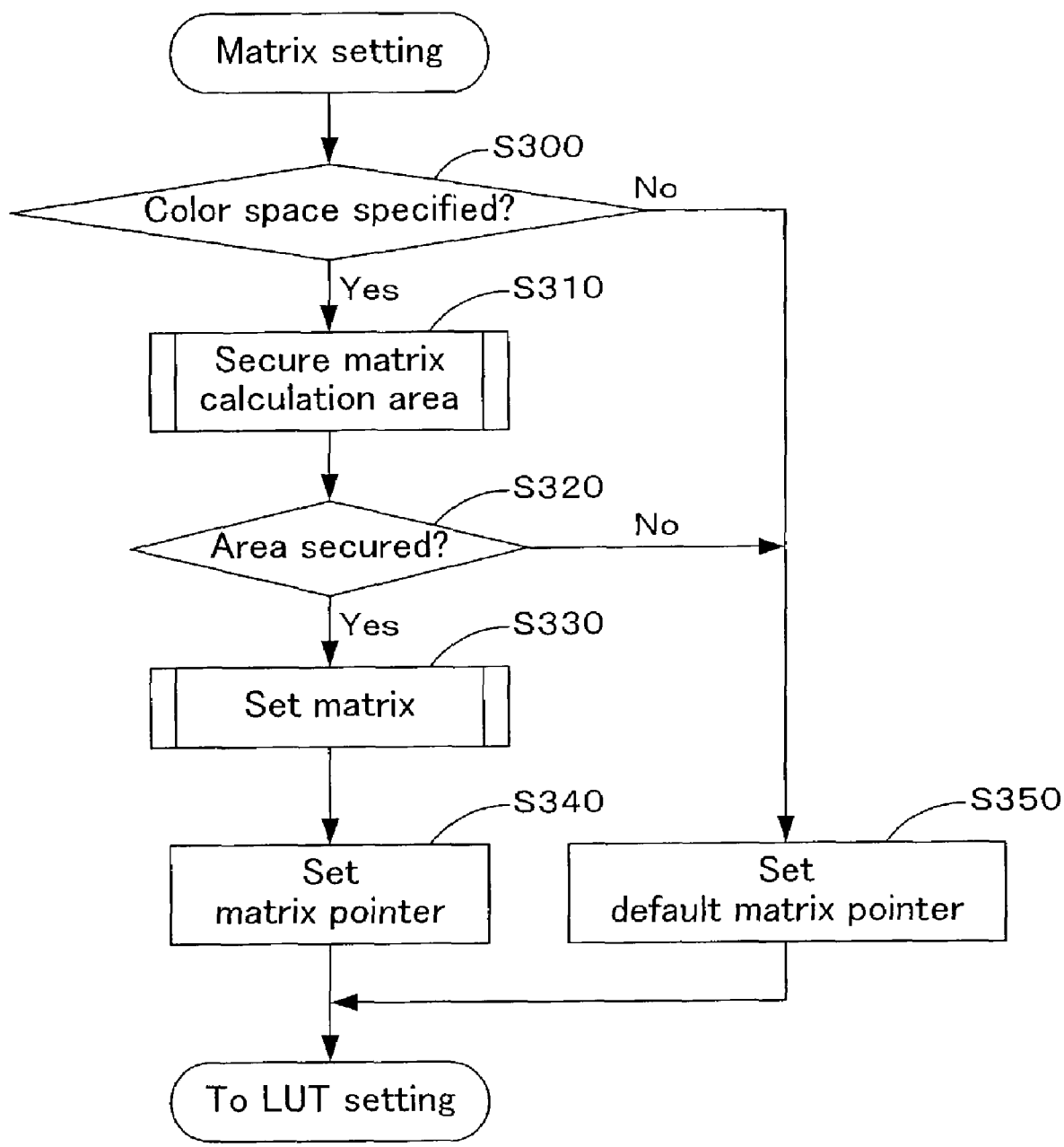
FIG. 13 is a flow chart showing the processing routine for matrix set-up processing in the color printer 20 according to the present embodiments.
Figure 14:
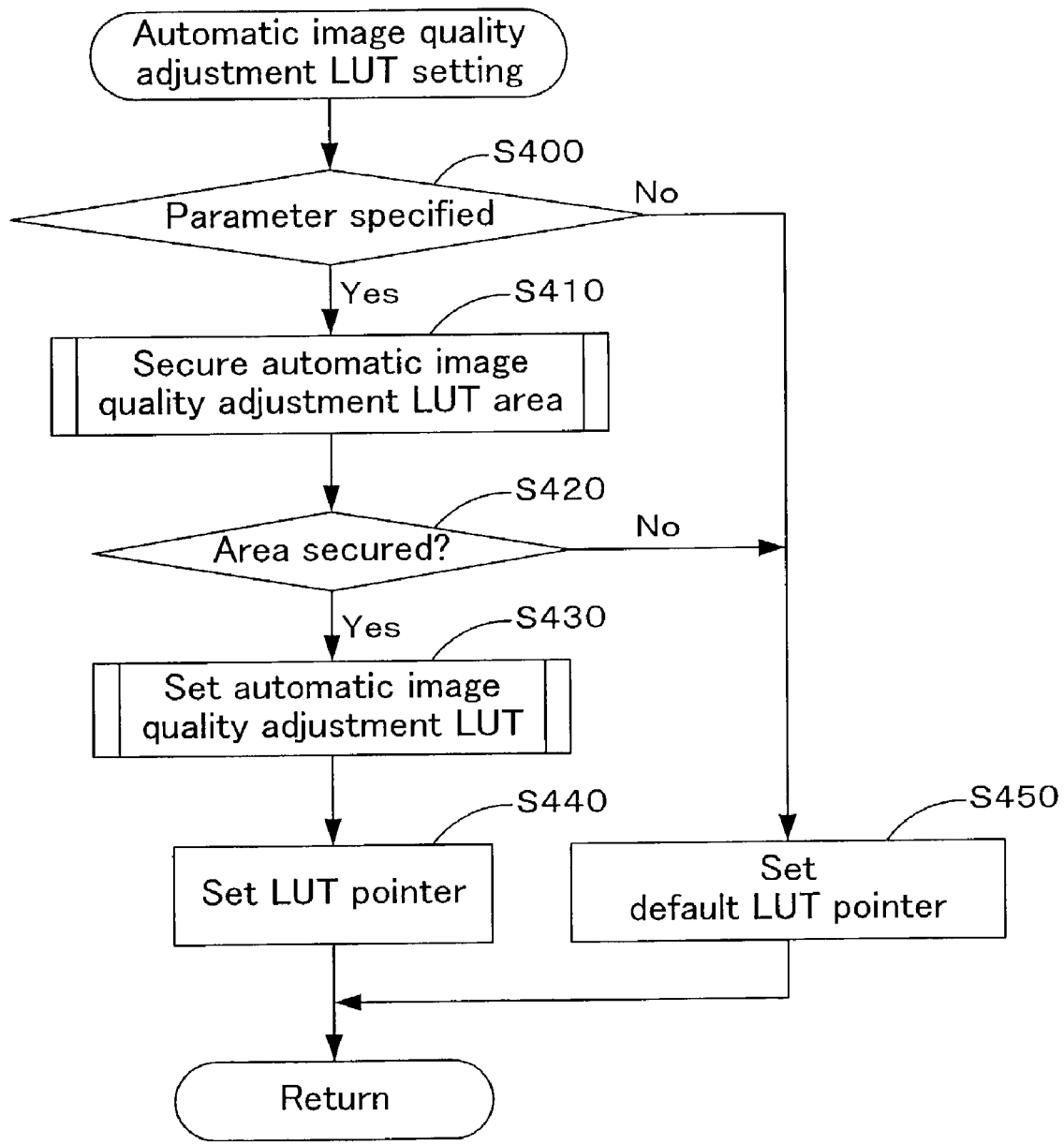
FIG. 14 is a flow chart showing the processing routine for automatic image quality adjustment LUT set-up processing in the color printer 20 according to the present embodiments.
Figure 15:
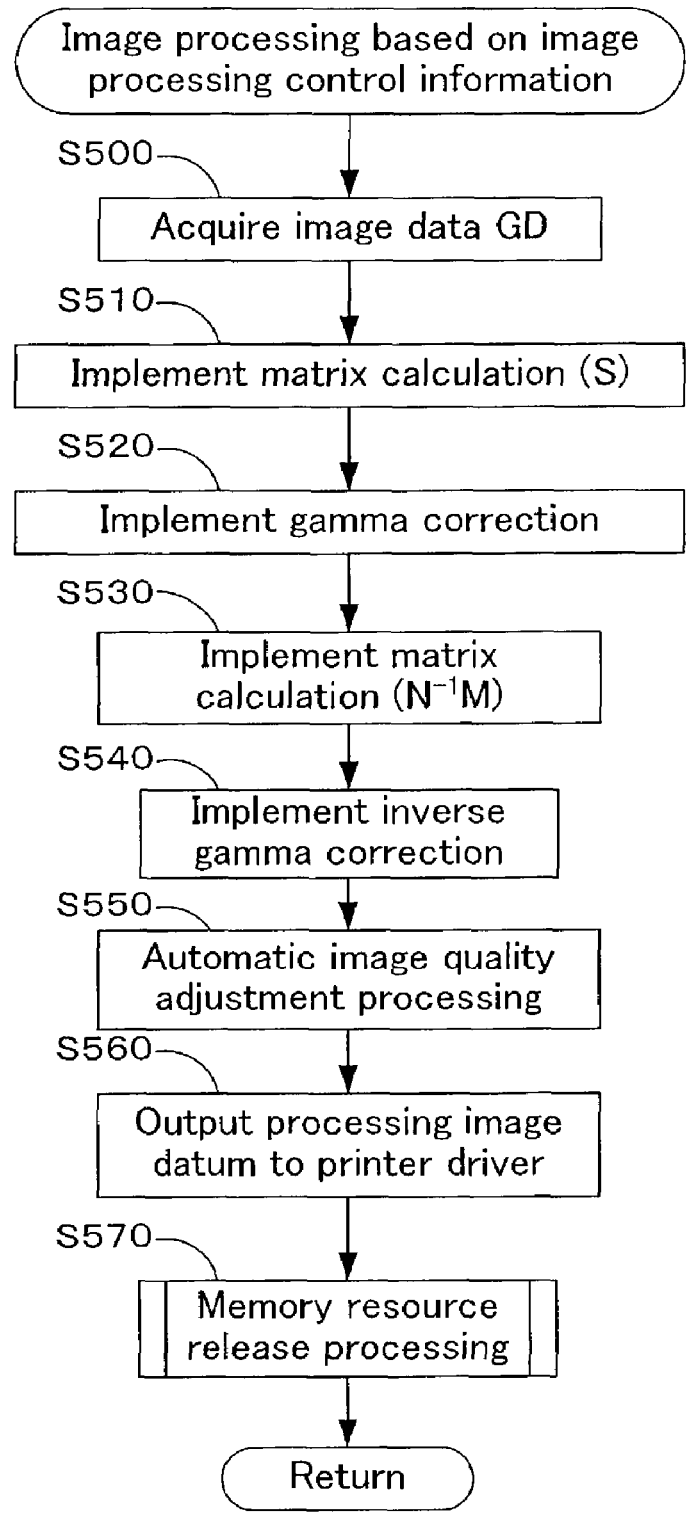
FIG. 15 is a flow chart showing the processing routine for image processing based on the image processing control information GC in the color printer 20 according to the present embodiments.
Figure 16:
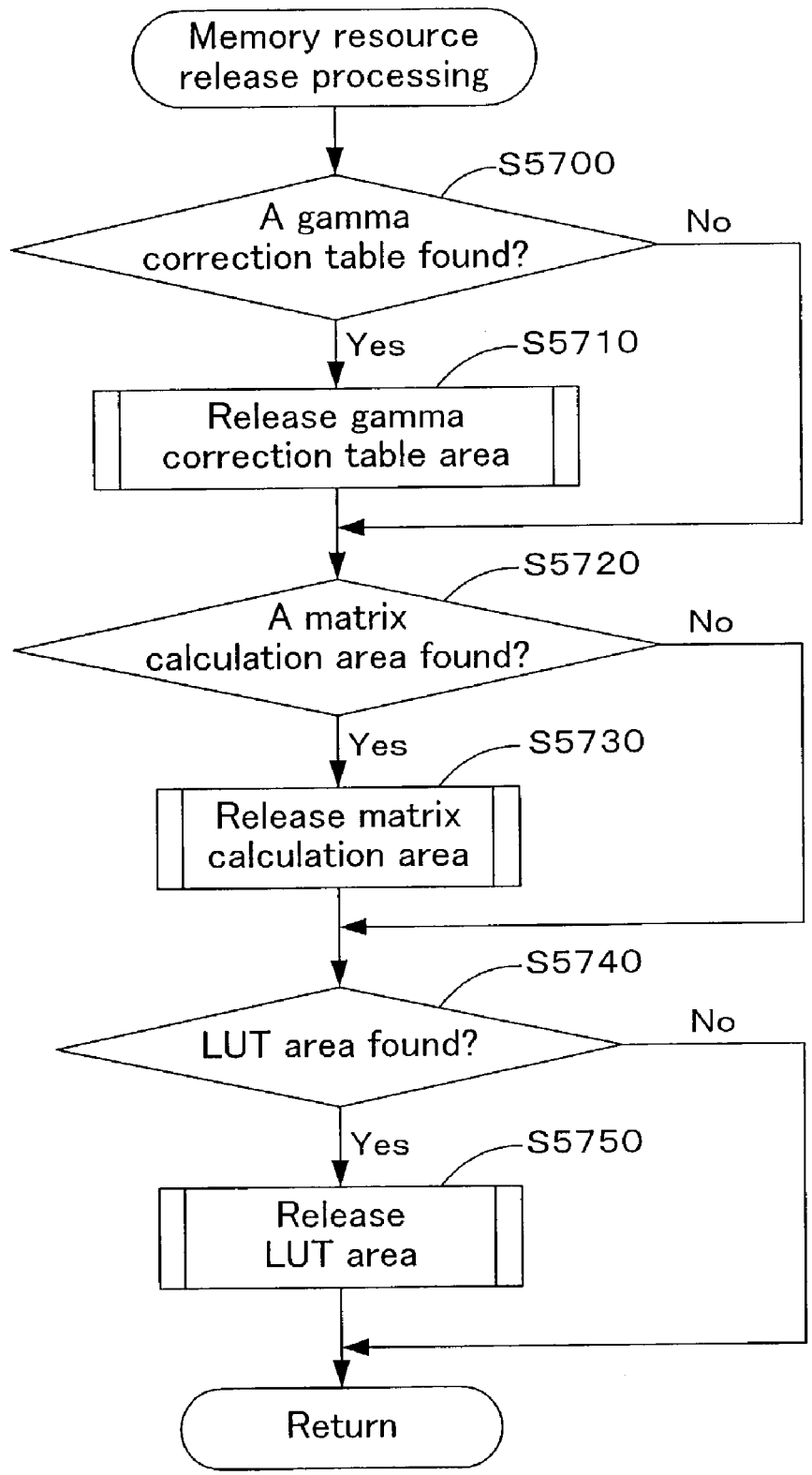
FIG. 16 is a flow chart showing the processing routine for regular image processing in the color printer 20 according to the present embodiments.
Figure 17:
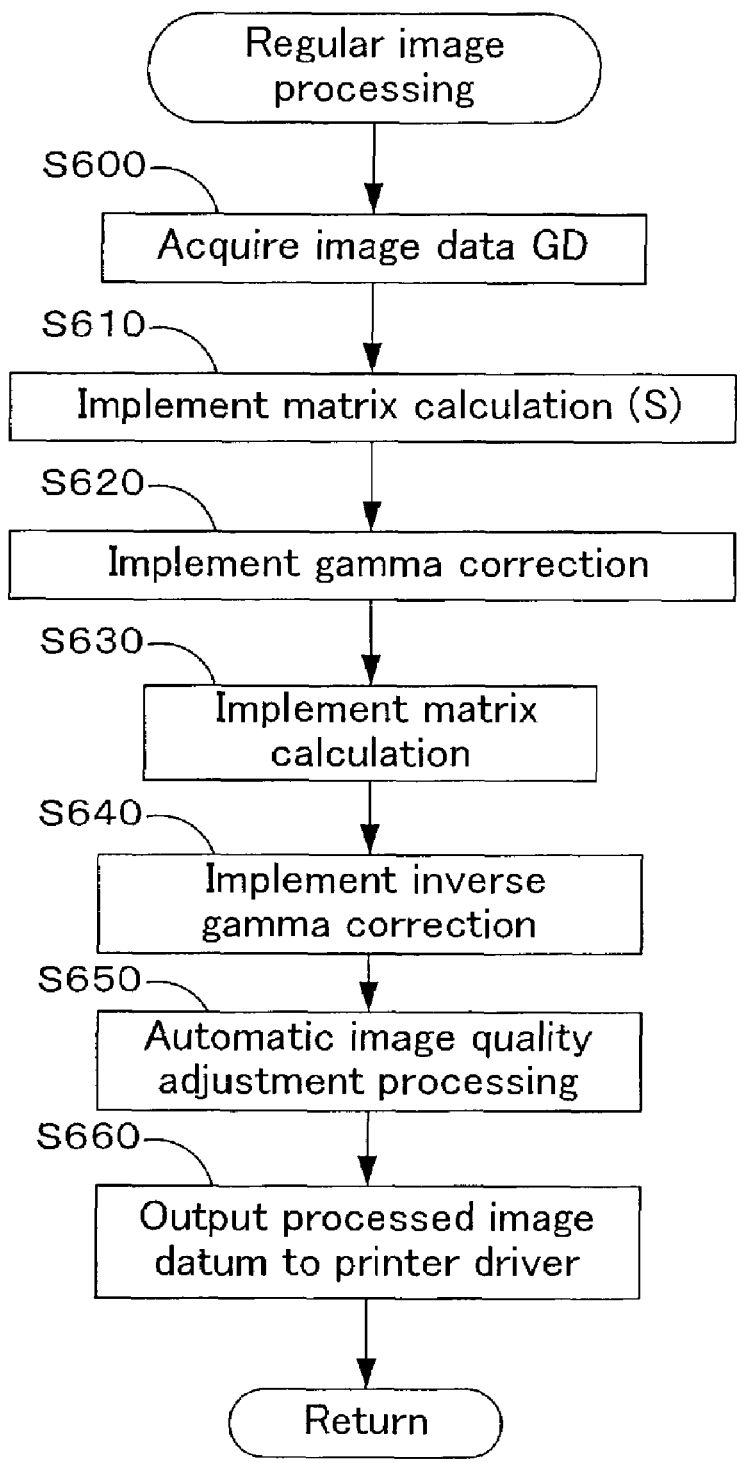
FIG. 17 is a flow chart showing the processing routine for memory resource release processing in the color printer 20 according to the present embodiments.

Image processing by the color printer 20 which functions as the image processing device according to the present embodiments will be described with reference to FIGS. 9 to 17. FIG. 9 is a flow chart showing the processing routine for image processing in the color printer 20 according to the present embodiments. FIG. 10 is a flow chart showing the processing routine for setting up a gamma correction table in the color printer 20 according to the present embodiments. FIG. 11 is a flow chart showing the processing routine for memory resource allocation processing for a gamma correction table in the color printer 20 according to the present embodiments. FIG. 12 is an explanatory view showing the condition where the amount of allocation of memory resources for a gamma correction table changes according to the number of image data. FIG. 13 is a flow chart showing the processing routine for matrix set-up processing in the color printer 20 according to the present embodiments. FIG. 14 is a flow chart showing the processing routine for automatic image quality adjustment LUT set-up processing in the color printer 20 according to the present embodiments. FIG. 15 is a flow chart showing the processing routine for image processing based on the image processing control information GC in the color printer 20 according to the present embodiments. FIG. 16 is a flow chart showing the processing routine for regular image processing in the color printer 20 according to the present embodiments. FIG. 17 is a flow chart showing the processing routine for memory resource release processing in the color printer 20 according to the present embodiments.

The image file GF generated by the digital still camera 12 is provided to the color printer 20 through a cable or through a memory card MC. When the power is turned ON by a user operation and an image data processing application (program) stored in the PROM 52 starts up, the CPU 51 acquires layout information for the image file GF (image data GD) from the set printing conditions. The CPU 51 resets an image file counter GN to 0, and sets the number of GF image files $GN_{ref}$ contained on one printing sheet to based on the acquired layout information (step S100).

The color printer 20 may be started up by detecting the insertion of the memory card MC into the card slot 22 or the connection of the digital still camera 12 to an input/output terminal 154 not illustrated through a cable.

For example, the CPU 51 reads the first image file GF from the memory card MC (step S110), temporarily stores the read image file GF in the RAM 53, and searches for the image processing control tag from the appended information storage area 112 for the image file GF (step S120). If the image processing control tag is found (step S130: Yes), the CPU 51 acquires the image processing control information GC written at the time the image data was generated and analyzes it (step S140). The CPU 51 sets up a gamma correction table, a color space conversion matrix and an automatic image quality adjustment LUT explained in detail below based on the analyzed image processing control information GC (step S150). The CPU 51 implements image processing based on the image processing control information GC using the set gamma correction table, color space conversion matrix and automatic image quality adjustment LUT (step S160).

If the image processing control tag cannot be found (step S130: No), the CPU 51 cannot implement image processing reflecting the image processing control information GC from when the image data was generated, and the default gamma correction table, color space conversion matrix and automatic image quality adjustment LUT stored in the PROM 52 are set as the gamma correction table, color space conversion matrix and automatic image quality adjustment LUT used in regular image processing. The CPU 51 implements regular image processing using the set gamma correction table, color space conversion matrix and automatic image quality adjustment LUT based on the default values (step S180).

Finally, the CPU 51 determines whether GN<$GN_{ref}$ (step S190). If the CPU 51 determines that GN<$GN_{ref}$, or in other words, that the image processing on all of the image files GF contained in one printing job is not complete (step S190: Yes), processing moves to step S110, the next image file GF is read, and image processing (steps S120 to S180) are carried out. If the CPU determines that GN=$GN_{ref}$, or in other words, that the image processing on all the image files GF contained in one print job is complete (step S190: No), the current processing routine ends.

A description of the set-up processing of the gamma correction table, which is one set of processing carried out in step S150, will be made with reference to FIG. 10. The CPU 51 determines whether the gamma value of the camera has been set in the read image processing control information GC (step S200). If it is determined that the gamma value of the camera has been set (step S200: Yes), the CPU 51 implements processing to secure a area for a gamma correction table described below in the storage area of the RAM 53 (step S210). If it is determined that the area for the gamma correction table has been secured (step S220: Yes), the CPU 51 generates a correction table according to the below formulas using the gamma value set by the image processing control information GC.

$Rs, Gs, Bs \geq 0$ $$Rs' = \left(\frac{Rs}{255}\right)^\gamma \quad Gs' = \left(\frac{Gs}{255}\right)^\gamma \quad Bs' = \left(\frac{Bs}{255}\right)^\gamma$$

$Rs, Gs, Bs < 0$ $$Rs' = -\left(\frac{-Rs}{255}\right)^\gamma \quad Gs' = -\left(\frac{-Gs}{255}\right)^\gamma \quad Bs' = -\left(\frac{-Bs}{255}\right)^\gamma$$

The CPU 51 sets a pointer indicating the offset position or the address stored in the generated gamma correction table (step S240). On the other hand, if it is determined that a gamma value has not been set for the image processing control information GC (step S200: No), and it is determined that a area for the gamma correction table cannot be secured (step S220: No), the CPU 51 sets a pointer indicating the default gamma correction table stored in the PROM 52 (step S250). Continuing, the CPU 51 implements set-up processing of a color space conversion matrix.

A description will be made of the memory resource allocation processing for the gamma correction table with reference to FIG. 11 and FIG. 12. Of the image processing carried out by the color printer 20, the gamma correction processing for creating a gamma correction table in response to the number of gradations for the image data is a type of image processing requiring more memory resources than the matrix calculation processing or the automatic image quality adjustment LUT, and also affects the gradation of the image data GD. For example, in gamma correction processing, from several tens of KB to several MB of memory resources are needed, while for matrix calculations, several bytes and for an automatic image quality adjustment LUT, several KB of memory resources are adequate. Accordingly, the allocation of memory resources for each image file GF can be said to be the allocation of memory resources for the gamma correction table.

In general, the image data has 8 bits (256) of gradation for each component, but it is possible to obtain favorable gradation printing effects by carrying out high precision calculations with more gradations in the internal calculations, so, for example, calculations with 16 bits (65536) of gradation or other such high gradations are carried out. If, however, a plurality of image data GD are contained in one printing job, the amount of memory resources allocated to the image processing of each image file GF (image data GD) is limited as already described. From the perspective of the amount of memory resources, when four image files GF are lined up horizontally, 65536 (bytes)×4=262 (KB) of memory resources are needed when using a gamma correction table having a 16-bit gradation, but with 14-bit gradation, only 16384 (bytes)×4=65 (KB) of memory resources are needed.

Accordingly, with 150 (KB) of memory resources which can be used for the image processing of image files GF, for example, the amount of memory resources which can be used in the gamma correction table is limited to 100 KB when the amount of memory resources allocated to the matrix calculations and the automatic image quality adjustment LUT are taken into consideration, and it is necessary to implement gamma correction processing using a gamma correction table having a 14-bit gradation. On the other hand, if only one image file GF is contained in one print job, the amount of memory resources needed is 65 (KB) even for a 16-bit gradation, so it is possible to implement gamma correction processing using a gamma correction table having a 16-bit gradation. In this manner, it is possible to printing results with a favorable gradation using a limited amount of memory resources by changing the gradation number in the gamma correction table in response to the number of image files GF contained in one print job.

Below, the concrete flow of the allocation processing of memory resources for the gamma correction table is described with reference to FIG. 11 and FIG. 12. The CPU 51 acquires printing conditions from a printer driver (step S2100). In concrete terms, layout information is acquired. The CPU 51 determines how many image files GF are lined up in the main scanning direction of one print sheet based on the acquired layout information, and sets the number of horizontal images HN (step S2110).

The CPU 51 determines whether HN≧4 (step S2120), and if it is determined that HN<4 (step S2120: No), it is determined whether HN≧2 (step S2130). If it is determined that HN<2 (step S2130: No), the CPU 51 sets a 16-bit gradation as that for the gamma correction processing as shown in FIG. 12, and allocates 66 KB for a area $WA_\gamma$ to create the gamma correction table. More specifically, the area secured for gamma correction processing is for generating the gamma correction table, and the gradation (resolution) of the gamma correction table is changed in response to the capacity of the allocated area.

On the other hand, if it is determined in step S2120 that HN≧4 (step S2120: Yes), the CPU 51 sets a 14-bit gradation as that for gamma correction processing as shown in FIG. 12, and allocates 16 KB for the area $WA_\gamma$ to create the gamma correction table. If it is determined that HN≧2 in the step S2130 (step S2130: Yes), the CPU 51 sets a 15-bit gradation for gamma correction processing as shown in FIG. 12, and allocates 33 KB for the area WA$_\gamma$ to create the gamma correction table.

The CPU 51 generates the gamma correction table with the set number of gradations (step S2150), and returns to the processing routine shown in FIG. 10. Depending on the allocation processing of the memory resources, if the number of image files GF laid out for one printing sheet is small, the effective resolution is low, and a high gradation is required, then a fine gradation reproducibility is realized; and if the number of image files GF laid out for one printing sheet is large, the effective resolution is high, and a high gradation is required, then the gradation is decreased. Accordingly, the amount of memory resources allocated to the gamma correction table is changed dynamically so the memory resources can be used effectively, and the number of gradations for the gamma correction table is changed according to the image size so the requirements for the image quality can be satisfied.

A description will be made of the set-up process of the color space conversion matrix which is one process carried out at step S150 with reference to FIG. 13. The CPU 51 determines whether the color space is specified in the read image processing control information GC (step S300). If it is determined that the color space is specified (step S300: Yes), processing is carried out to secure a matrix calculation area in the storage area of the RAM 53 for developing the results of matrix calculations on the color values of the image data GD (step S310). When it is determined that the matrix calculation area is secured (step S320: Yes), the CPU 150 sets the color space conversion matrix based on the specified color space specified in the image processing control information GC. For example, if an NTSC color space is specified as the color space, the color space conversion matrix below will be used.

$$\begin{pmatrix} Rw \\ Gw \\ Bw \end{pmatrix} = N^{-1}M \begin{pmatrix} Rs' \\ Gs' \\ Bs' \end{pmatrix}$$

$$N^{-1}M = \begin{pmatrix} 0.7152 & 0.2848 & 0.0001 \\ 0.0000 & 1.0001 & 0.0000 \\ 0.0000 & 0.0412 & 0.9588 \end{pmatrix}$$

The matrix calculation $N^{-1}M$ is a combined matrix made from a matrix calculation M using a matrix M for converting RGB color space into XYZ color space, and a inverse matrix calculation $N^{-1}$ of a matrix calculation N using a matrix N for converting WRGB color space into XYZ color space. The matrix M is not included in the display color area of sRGD color space, but is for maintaining effective image data (color values) as data, and converting the image data based on RGB color space to image data based on XYZ color space. The matrix values of the matrix M are determined according to the color space specified by the image processing control information GC. The inverse matrix N of the matrix N is for converting image data converted to image data based on XYZ color space by the matrix calculation M to wRGB color space having a area defined larger than sRGB color space (returning them to RGB color space). XYZ color space is one machine independent color space not dependent on the output properties of the machine, and is used for making correspondences for color values between RGB color space and wRGB color space.

After the matrix calculation $N^{-1}M$ is carried out, the color space of the obtained image data GD is wRGB color space having a area with a larger definition than sRGB color space. Conventionally, the color space used in image processing by a printer or computer is fixed at sRGB, but it was not possible to effectively use the color space of the digital still camera 12. In contrast thereto, in the present embodiments, when color space information is contained in the image file GF, the matrix ($N^{-1}M$) used in matrix calculation M corresponding to the color space information is changed, so the color space of the digital camera 12 is effectively used, and correct color reproduction is possible.

The CPU 51 sets a pointer indicating the offset position or the memory address in the set matrix calculation area (step S340). If, however, it is determined that a color space is not specified in the image processing control information GC (step S300: No), and if it is determined that a matrix calculation area cannot be secured (step S320: No), the CPU 51 sets a pointer showing the default matrix calculation table stored in the PROM 52 (step S250). Continuing, the CPU 51 implements set-up processing for the image quality adjustment LUT.

The set-up processing for the automatic image quality adjustment LUT, which is one type of processing carried out in step S150, will be described with reference to FIG. 14. The CPU 51 determines whether image quality adjustment parameters are set in the read image processing control information GC (step S400). If it is determined that image quality adjustment parameters have been set (step S400: Yes), the CPU 51 implements processing to secure a area for an automatic image quality adjustment LUT in the storage area of the RAM 53 in order to generate an automatic image quality adjustment LUT base on the specified image quality adjustment parameters (step S410). If it is determined that the area for the automatic image quality adjustment LUT has been secured (step S420: Yes), the CPU 51 generates an automatic image quality adjustment LUT based on the image quality adjustment parameters specified by the image processing control information GC.

With image quality automatic adjustment processing according to the present embodiments, the image data GD contained in the image file GF is analyzed, characteristic parametric values showing the image quality are acquired, and automatic adjustment of the image quality is carried out by correcting the image data, reflecting the image processing control information GC contained in the image file GF and the acquired characteristic parametric values. In the image quality automatic adjustment processing, standard parameters which are correction targets are set beforehand, and differences between the standard parameters and the characteristic parameters of the image data GD are eliminated, or an image correction amount is determined such as to decrease the differences. In this process, the image processing control information GC may be used to change the standard parameter values, or may be used to change the degree to which the differences between the standard parameters and the characteristic parameters of the image data GD are decreased and the level of the application of the image correction amount.

Image data correction is carried out for each pixel using a characteristic line associating the RGB signal input level and the output level, generally called a tone curve, for the brightness, contrast, color balance and the like, for example, with the image correction amount as the input level. Also, pixel calculation processing (filter processing), not tone curve processing, is carried out for each pixel for the color saturation, sharpness, noise decrease, and the like, for example.

The CPU 51 sets a pointer indicating the offset position or the memory address stored by the generated automatic image quality adjustment LUT (step S440). If it is determined, however, that the image quality adjustment parameters have not been specified in the image processing control information GC (step S400: No), and it is determined that an automatic image quality adjustment LUT area cannot be secured (step S420: No), the CPU 51 sets a pointer indicating the default automatic image quality adjustment LUT stored in the PROM 52 (step S450). Continuing, the CPU 51 returns to the processing routine show in FIG. 9.

Image processing based on the image processing control information carried out by the color printer 20 will be described in detail with reference to FIG. 15. The CPU 51 in the color printer 20 retrieves image data GD from the read image file GF (step S500). The read image data GD is not an original but a copy, and until the image processing is complete, a variety of image processing is carried out on the copy of the image data GD.

The digital still camera 12 saves image data as a file with a JPEG format as already described, and the image data is saved in the JPEG file using YCbCr color space to increase the compression ratio.

The CPU 51 implements a 3×3 matrix calculation S in order to convert the image data based on YCrCb color space to image data based on RGB color space (step S510). The matrix calculation S is the formula shown below.

$$\begin{pmatrix} Rs \\ Gs \\ Bs \end{pmatrix} = S \begin{pmatrix} Y \\ Cb - 128 \\ Cr - 128 \end{pmatrix}$$

$$S = \begin{pmatrix} 1 & 0 & 1.40200 \\ 1 & -0.34414 & -0.71414 \\ 1 & 1.77200 & 0 \end{pmatrix}$$

The CPU 51 implements gamma correction processing on image data based on RGB color space thus obtained (step S520). For carrying out the gamma correction processing, the CPU 51 specifies the gamma correction pointer set beforehand, and implements the gamma correction processing is carried out on the image data GD using the gamma correction table stored in the RAM 53.

The CPU 51 implements the matrix calculation $N^{-1}M$ on the image data GD, which has undergone gamma correction, using the matrix $N^{-1}M$ already described in order to make correspondences between the original color space and wRGB color space (step S530). When carrying out the matrix calculation $N^{-1}M$, the CPU specifies the matrix calculation pointer in the RAM 53 set beforehand, and writes the results of the calculations on the image data GD to the specified area.

The CPU 51 implements inverse gamma correction on the image data obtained from the matrix calculation $N^{-1}M$ (step S50). To implement inverse gamma correction, the CPU 51 implements inverse gamma correction processing on the image data GD using the printer's default inverse gamma correction table stored in the PROM 52. The formula used to create the inverse gamma correction table is as below.

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

The CPU 51 implements automatic adjustment processing for image quality on the image data GD which has undergone inverse gamma correction (step S550). To do so, the CPU 51 specifies the automatic image quality adjustment pointer set beforehand, and implements automatic image quality adjustment processing on the image data GD using the automatic image quality adjustment LUT stored in the RAM 53.

When the image quality automatic adjustment processing ends, the CPU 51 outputs the processed image data to the printer driver (step S560), implements memory resource release processing (step S570), and returns to the processing routine shown in FIG. 9.

The memory resource release processing carried out in step 570 of the processing routine in FIG. 15 will be described with reference to FIG. 16. The CPU 51 determines whether a gamma correction table has been generated in the RAM 53 (step S5700). If it is determined that a gamma correction table has been generated in the RAM 53 (step S5700: Yes), the CPU 51 releases those memory resources allocated for the processed image data GD that comprise the gamma correction table (step S5710). If it is determined that a gamma correction table has not been generated in the RAM 53 (step S5700: No), the CPU 51 continues with the object processing in step S5720.

The CPU 51 determines whether a matrix calculation area has been allocated in the RAM 53 (step S5720). If it is determined that a matrix calculation area has been allocated in the RAM 53 (step S5720: Yes), the CPU 51 releases those memory resources allocated for the processed image data GD which comprise the matrix calculation area (step S5730). If it is determined that a matrix calculation area has not been allocated in the RAM 53 (step S5720: No), the CPU 51 moves to the processing in step S5740.

The CPU 51 determines whether an automatic image quality adjustment LUT has been generated in the RAM 53 (step S5740). If it is determined that an automatic image quality adjustment LUT has been generated in the RAM 53 (step S5740: Yes), the CPU releases those memory resources allocated for the processed image data GD comprising the automatic image quality adjustment LUT (step S5750), and returns to the processing routine shown in FIG. 15. If it is determined that an automatic image quality adjustment LUT is not generated in the RAM 53 (step S5740: No), the CPU returns to the processing routine shown in FIG. 15.

Ordinary image processing carried out by the color printer 20 will be described in detail with reference to FIG. 17. Processing carried out in steps similar to that of the image processing based on the image processing control information GC described with reference to FIG. 15 will be merely described in simple terms. The CPU 51 of the color printer 20 retrieves image data GD from the read image file GF (step S600). The CPU 51 implements the 3×3 matrix calculation S in order to convert the image data based on YCrCb color space to image data based on RGB color space (step S610). The matrix calculation S is the formula already mentioned. The CPU 51 clips the image data obtained by the matrix calculation S and rounds it to values that are negative or else 256 or higher (for 8-bit gradation).

The CPU 51 implements gamma correction processing on using the default gamma correction table (step S620), and implements color space conversion processing on the image data GD using the default color space conversion matrix table (step S630). The CPU 51 implements inverse gamma correction processing on the image data GD which has undergone color space conversion processing (step S640), implements automatic image quality adjustment processing on the image quality (step S650), outputs the image data GD which has undergone image processing to the printer driver (step S660), and returns to the processing routine shown in FIG. 9. For each processing step, the CPU 51 specifies the pointer set beforehand and acquires a table and LUT.

Figure 18:
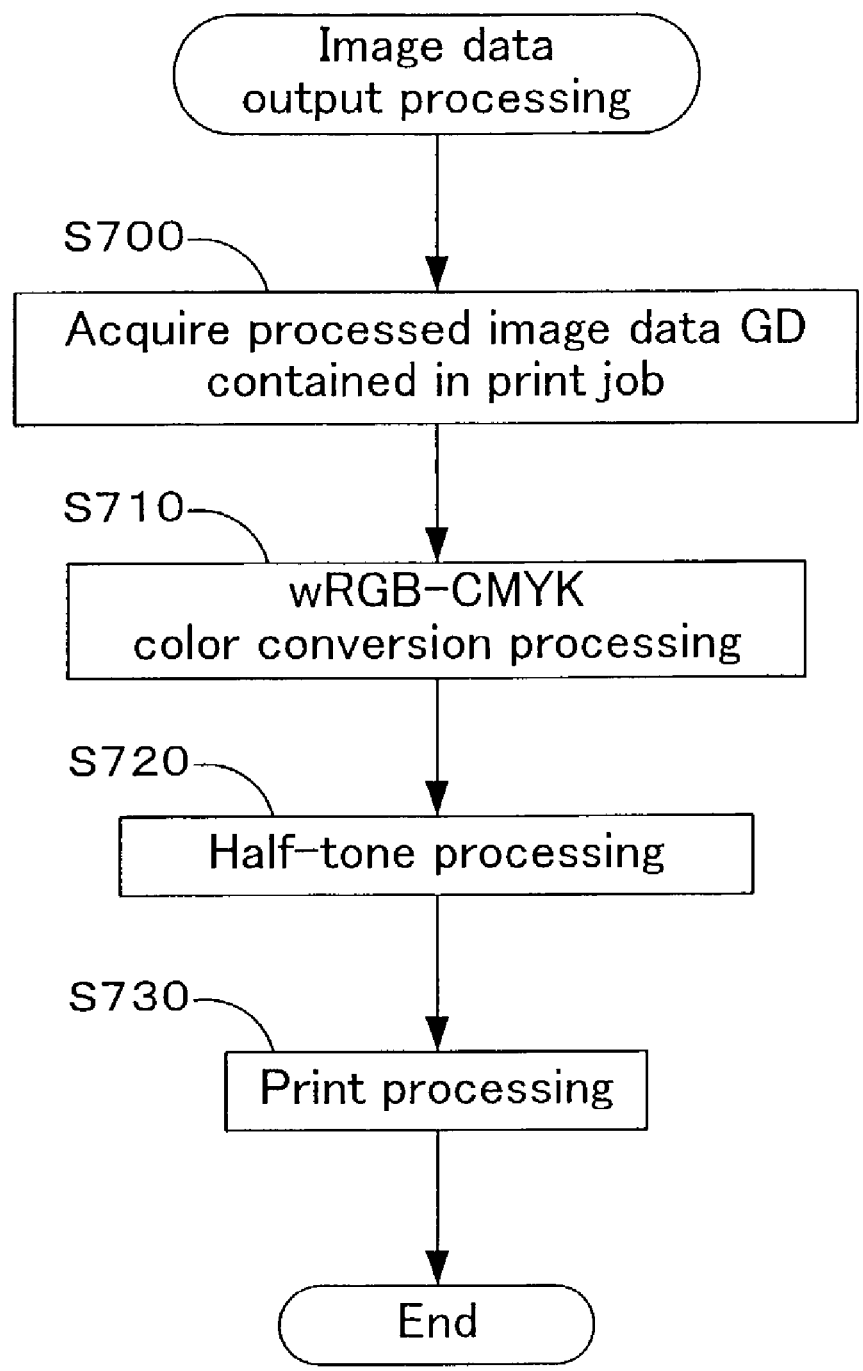
FIG. 18 is a flow chart showing a processing routine for image data output processing in the color printer 20 according to the present embodiments.

Output processing, or more specifically, print control processing carried out by the printer driver (print control program) on the image data GD will be described with reference to FIG. 18. The CPU 51 acquires image data contained in a print job (step S700), and implements wRGB-CMYK color conversion processing in order to print (step S710). Before the color conversion processing, it is fine to generate new data between neighboring image data using linear interpolation if the resolution of the image data GD is lower than the print resolution, and it is fine to implement resolution conversion processing to convert the resolution of the image data to the print resolution by carrying out pixel skipping on the data at a fixed ratio if, on the other hand, the resolution of the image data GD is higher than the print resolution.

The results of the image processing on the copy of the image data GD thus far may be reflected in the original image data GD by opting to overwrite the image data. The CPU 51 changes the color space of the image data from wRGB color space to CMYK color space while referencing a conversion look-up table (LUT) associating the wRGB color space with the CMYK color space stored in the PROM 52. More specifically, the image data comprising R, G and B gradation values is converted to, for example, data having gradation values of the six colors C, M, Y, K, LC and LM used by the color printer 20.

The CPU 51 implements the half-tone processing (step S720), implements the print processing (step S730), and ends the current processing routine. For half-tone processing, color-converted image data are received, and gradation number conversion processing is carried out. In the present embodiments, the image data after color conversion is realized as having a 256 gradation width for each color. In contrast thereto, the color printer 20 of the present embodiments can color only in a state of either "forming dots" or "not forming dots," and the color printer 20 of the present embodiments can only render locally in 2 gradations. Image data having 256 gradations is thus converted to image data expressed in 2 gradations renderable by the color printer 20. Typical methods of this 2-gradation conversion (binarizing) processing are those referred to as the error diffusion method and the ordered dithering method. The CPU 51 implements interlace processing, reorganizing the image data converted to a format indicating the presence of dot formation into the sequence to be transmitted to the color printer 20.

According to the color printer 20 of the present embodiments, as described above, when there is a plurality of image printings, the amount of memory resources to be used for the image processing of each image file GF is decided with the maximum number of files laid out in the main scanning direction of the printing, the image processing is carried out with the decided amount of memory resources, and the memory resources are released after the image processing. Thus, it is possible to decrease the amount of memory resources required for image processing, and an adequate image quality can be realized for the print resolution.

In particular, for a stand-alone type printer or portable device when a series of image processing must be carried out with limited memory resources, even if the limited memory resources are restricted, it is possible to implement image processing using the available memory resources effectively.

In the present embodiments, when there is a large number of image files lined up in the printing direction (main scanning direction) for one sheet of printing paper, the gradation number of the gamma correction table is decreased, varying the gradation number each time a gamma correction table, which requires the most memory resources, is created. Thus, it is possible to output images having a high gradation when the print image resolution is high, and it is possible to implement image processing on a plurality of image data GD with limited memory resources for a low print image resolution not requiring gradation.

F. Other Embodiments

In the embodiments, a stand-alone type color printer 20 for carrying out image processing and print processing was used as an output device to implement image processing on image data GD; however, the present invention may be realized as an image processing device, and image processing may be carried out with the personal computer PC, a stand-alone type display device equipped with a display control circuit, or a portable terminal. In these cases, the benefits of the present invention may be enjoyed where image processing is carried out on a plurality of image files by effectively using the memory resources. In particular, the present invention is useful for a portable terminal whose memory resources are limited.

When the image processing is carried out using a stand-alone type display device, the output job is a display job whose image processing is carried out by the display control circuit. The image data is supplied to the display device through, for example, a network system, flash memory or other storage medium. The display device implements image processing in conjunction with the execution of gamma table generation processing and color conversion processing (matrix calculation processing and LUT processing) described in the present embodiments. As a result, it is possible to decrease the memory resources required for image processing. Alternately, is it possible to implement image processing effectively using the provided memory resources. For example, when the display device is an interlace (progressive) type CRT display device, image output is possible by main scanning column of an electron gun, so image processing equivalent to that with the printer described in the present embodiments is possible.

Also, the amount of memory resources allocated for image processing exemplified in the present embodiments does not exceed exemplification used as convenience in the description; in the working of the invention, this may of course be modified arbitrarily according to the properties and use of the individual products.

Further, even when a plurality of image data is printed on one sheet of printing paper, image processing may be carried out identical to that for all the image files in the so-called index printing and matrix printing modes. In these cases, the requirements on the quality of the image are ordinarily low because they are used to show which image files are included.

In the embodiments, memory resources were allocated for each image file, but the memory resources for the gamma correction table may be saved independently from the memory resources used for the matrix calculations and the like. In this case, different gamma values are acquired from the image files contained in one print job, and the memory resources for the gamma correction table can be allocated according to the number of different gamma values. More specifically, it is possible use the same gamma correction table for image files GF having the same gamma value, decreasing the memory resources.

Further, in the embodiments, image processing is carried out, maintaining the minimum amount of memory resources with the premise of releasing the memory resources; however, for example, the number of image data contained in one output job can be detected, memory resources allocated beforehand in response to the number of image data detected without maintaining the minimum amount of memory resources, and image processing carried out within the range of the allocated memory resources. This is useful in cases such as when the resolution requirement for the output image is low. In such cases, it is not necessary to implement release processing for the memory resources.

An image processing device, an image processing method, an image processing program, and an image output device according to the present invention were described above based on the present embodiments, but the modes of the above-described invention are to facilitate understanding of the present invention and do no limit the present invention. The present invention may be modified and improved without deviating from the main gist or the Scope of claims, and items equivalent to the present invention are of course contained therein.

The values of the matrices S and $N^{-1}M$ in various formulas are merely exemplifications, and it goes without saying that they may be arbitrarily modified according to the targeted color space or a color space, etc., available in the color printer 20.

The embodiments were described using the digital still camera 12 as the image file generation device; however, scanners, digital video cameras and the like may also be used. If a scanner is used, the invention may be worked by the scanner alone, with the specification of the read data information for the image files GF carried out on the computer PC, or a preset button, display screen for arbitrary setting, or set-up button provided to allocate the preset information for the information set-up on the scanner.

The embodiments were described using an a file having an Exif format as a concrete example of an image file GF, but the image file format according to the present invention is not limited thereto. In greater detail, it is fine as long as there are image data generated by the image data generation device, and an image file containing image processing control information GC mentioning the generation conditions (information) for the image data. With such a file, it is possible to output image quality for the image data generated with the image file generation device with suitable automatic adjustment.

The embodiments were described using the case where the image data GD and the image processing control information GC are contained in the same image file GF as an example; however, the image data GD and image processing control information GC need not necessarily be stored in the same file. In greater detail, it is favorable for the image data GD and the image processing control information GC to be associated; for example, associated data may be generated associating the image data GD with the image processing control information GC, one or a plurality of image data and image processing control information GC may be stored in separate files, and the associating image processing control information GC may be referred to when processing the image data GD. In this case, the image data and the image processing control information GC may be stored in separated files, and at the time of image processing when the image processing control information GC is used, the image data and the image processing control information GC have an absolutely unchangeable relationship, which substantially has the same function as when they are stored in the same file. In greater detail, a mode using an association between the image data and the image processing control information GC contains an image file GF in the present embodiments at least at the time of the image processing. Further, image files stored on an optical disk medium such as a CD-ROM, CD-R, DVD-ROM or DVD-RAM are also included.

The invention claimed is:

1. An image processing device for carrying out image processing using image data and image processing control information used during image processing of the image data as well as associated therewith, the image processing device comprising:
   detection unit for detecting a number of image data contained in one output job;
   dividing unit for dividing the storage area of storage unit based on the detected number of image data;
   acquiring unit for acquiring the image processing control information associated with each of the image data; and
   image processing unit for using the divided storage area to implement image processing on the image data using the acquired image processing control information.

2. An image processing device for carrying out image processing using image data and image processing control information used during image processing of the image data as well as associated therewith, the image processing device comprising:
   storage unit having a storage area with a predetermined capacity used in the image processing;
   image data number detecting unit for detecting a maximum number of image data contained in a main scanning direction, which is a movement direction, of an output mechanism for carrying out image output;
   storage area dividing unit for dividing the storage area based on the detected number of image data;
   acquiring unit for acquiring the image processing control information associated with each of the image data along the scanning line;
   image processing unit for carrying out image processing based on the acquired image processing control information on the image data corresponding thereto using the divided storage area; and
   storage area releasing unit for releasing the used storage area when image processing on the image data is complete.

3. An image processing device for carrying out image processing using image data and image processing control information used during image processing of the image data as well as associated therewith, the image processing device comprising:
   storage unit having a storage area with a capacity smaller than a work area capacity needed for image processing on all image data contained in one output job;
   image processing unit for controlling, securing and releasing of a work area in the storage area in units of image data, and carrying out image processing on each of all image data contained in one output job using the image processing control information associated with each of all image data, wherein the work area is needed for image processing of one unit of image data; and
   image data transmission unit for transmitting image data having undergone the image processing.

4. A method of carrying out image processing using image data and image processing control information used during image processing of the image data as well as associated therewith, the method comprising:
- detecting a maximum number of image data contained in a main scanning direction, which is a movement direction, of an output mechanism for carrying out image output;
- dividing the storage area of storage unit based on the detected number of image data;
- acquiring the image processing control information associated with each of the image data along the main scanning direction;
- using the divided storage area to implement image processing on the image data using the acquired image processing control information; and
- releasing the used storage area when image processing of the image data is complete.

5. A method of carrying out image processing using image data and image processing control information used during image processing of the image data as well as associated therewith, the method comprising:
- detecting a number of image data contained in one print job;
- dividing the storage area of storage unit based on the detected number of image data;
- acquiring the image processing control information associated with each of the image data; and
- using the divided storage area to implement image processing on the image data using the acquired image processing control information.

6. A computer readable medium storing image processing program codes for carrying out image processing using image data and image processing control information used during image processing of the image data as well as associated therewith, the computer readable medium comprising:
- a computer program code for detecting a maximum number of image data contained in a main scanning direction, which is a movement direction, of an output mechanism for carrying out image output;
- a computer program code for dividing the storage area of storage unit based on the detected number of image data;
- a computer program code for acquiring the image processing control information associated with each of the image data along the main scanning direction;
- a computer program code for using the divided storage area to implement image processing on the image data using the acquired image processing control information; and
- a computer program code for releasing the used storage area when image processing of the image data is complete.

7. A computer readable medium storing image processing program codes for carrying out image processing using image data and image processing control information used during image processing of the image data as well as associated therewith, the computer readable medium comprising:
- a computer program code for detecting a number of image data contained in one print job;
- a computer program code for dividing the storage area of storage unit based on the detected number of image data;
- a computer program code for acquiring the image processing control information associated with each of the image data; and
- a computer program code for using the divided storage area to implement image processing on the image data using the acquired image processing control information.

* * * * *